US012475480B2

(12) United States Patent
Pronski et al.

(10) Patent No.: US 12,475,480 B2
(45) Date of Patent: Nov. 18, 2025

(54) SYSTEM AND METHOD FOR AUTOMATICALLY GENERATING A CUSTOMIZED INCENTIVE INTERFACE

(71) Applicant: The Toronto-Dominion Bank, Toronto (CA)

(72) Inventors: Michael Pronski, Toronto (CA); Darius Braziunas, Toronto (CA); Shereeka Mcewan, Toronto (CA)

(73) Assignee: The Toronto-Dominion Bank, Toronto (CA)

( * ) Notice: Subject to any disclaimer, the term of this patent is extended or adjusted under 35 U.S.C. 154(b) by 21 days.

(21) Appl. No.: 17/592,572

(22) Filed: Feb. 4, 2022

(65) Prior Publication Data
US 2023/0252515 A1    Aug. 10, 2023

(51) Int. Cl.
G06Q 30/02       (2023.01)
G06Q 30/0207    (2023.01)

(52) U.S. Cl.
CPC .................. *G06Q 30/0225* (2013.01)

(58) Field of Classification Search
None
See application file for complete search history.

(56) References Cited

U.S. PATENT DOCUMENTS 7,668,619 B2    2/2010    Torian
8,893,966 B2    11/2014   Wilen et al.
(Continued)

OTHER PUBLICATIONS

EGifter: eGifter B2B Sales Portal; retrieved from: https://corporate.egifter.com/b2b-sales-portal/ on Dec. 14, 2021.
(Continued)

*Primary Examiner* — Mathew Syrowik
(74) *Attorney, Agent, or Firm* — Rowand LLP

(57) ABSTRACT

A server computer system comprises a communications module; a processor coupled with the communications module; and a memory coupled to the processor and storing processor-executable instructions which, when executed by the processor, configure the processor to store, in a database and in association with a provider of one or more incentives, data associated with at least one bulk order of incentives, the data including identifying information of a purchaser of the at least one bulk order of incentives and a unique number for each incentive; authenticate a computing device associated with the provider of the one or more incentives; obtain, from the database, at least one graphical object associated with the provider of the one or more incentives; automatically generate a customized incentive interface by populating one or more interface elements of a white label incentive interface, the customized incentive interface including at least a summary of the at least one bulk order of incentives and the at least one graphical object associated with the provider of the one or more incentives; and send, via the communications module and to the computing device associated with the provider of the one or more incentives, a signal causing the computing device to display the customized incentive interface that includes at least the summary of the at least one bulk order of incentives and the at least one graphical object associated with the provider of the one or more incentives.

20 Claims, 17 Drawing Sheets

(56) References Cited

U.S. PATENT DOCUMENTS

| | | | |
|---|---|---|---|
| 9,508,096 B2 | 11/2016 | Cummins et al. | |
| 9,881,299 B2 | 1/2018 | Isaacson et al. | |
| 10,121,127 B1 | 11/2018 | Isaacson et al. | |
| 10,692,060 B2 | 6/2020 | Gardner et al. | |
| 10,846,684 B2 | 11/2020 | Curtis | |
| 2010/0280921 A1* | 11/2010 | Stone | G06Q 30/0641 715/765 |
| 2010/0299194 A1* | 11/2010 | Snyder | G06Q 30/0211 705/14.23 |
| 2013/0297431 A1 | 11/2013 | Deubell et al. | |
| 2013/0304605 A1* | 11/2013 | Glass | G06Q 30/06 705/26.5 |
| 2013/0325671 A1* | 12/2013 | Glass | G06Q 30/06 705/27.1 |
| 2014/0207662 A1 | 7/2014 | Isaacson et al. | |
| 2014/0258019 A1* | 9/2014 | Cummins | G06Q 30/0621 705/26.5 |
| 2015/0262183 A1* | 9/2015 | Gervais | G06Q 20/405 705/44 |
| 2015/0294302 A1 | 10/2015 | Snyder et al. | |
| 2015/0317711 A1* | 11/2015 | Glass | G06Q 50/04 705/26.5 |
| 2015/0356649 A1* | 12/2015 | Glass | H04L 65/403 705/26.1 |
| 2016/0232480 A1* | 8/2016 | Erez | G06Q 20/12 |
| 2017/0161823 A1* | 6/2017 | Glass | H04N 21/4312 |
| 2017/0193495 A1 | 7/2017 | Conte et al. | |
| 2017/0255926 A1* | 9/2017 | Glass | G06Q 20/348 |
| 2018/0144313 A1* | 5/2018 | Gardner | G06Q 20/351 |
| 2018/0225735 A1* | 8/2018 | Glass | G06Q 30/0621 |
| 2018/0260834 A1* | 9/2018 | Stuckey | G06Q 20/4016 |
| 2019/0130387 A1* | 5/2019 | Arora | H04L 9/3247 |
| 2021/0142321 A1* | 5/2021 | Kaczmarek | G06Q 10/08 |
| 2022/0027915 A1* | 1/2022 | Cameron | G06Q 20/12 |

OTHER PUBLICATIONS

NGC—A Blackhawk Network Business: "Fulfillment Services—Bulk Gift Cart Fulfillment", retrieved from: https://www.ngc-group.com/buyer-overview/bulk-fulfillment, on Dec. 14, 2021.

USPTO; Office Action relating to U.S. Appl. No. 17/952,648 dated Apr. 7, 2025.

* cited by examiner

SYSTEM AND METHOD FOR AUTOMATICALLY GENERATING A CUSTOMIZED INCENTIVE INTERFACE

TECHNICAL FIELD

The present application relates to systems and methods for automatically generating a customized incentive interface.

BACKGROUND

Incentives such as digital incentives may be provided for a number of reasons. It is often difficult to manage and track incentives as the provider may not have a system set up to manage and track the incentives.

BRIEF DESCRIPTION OF THE DRAWINGS

Embodiments are described in detail below, with reference to the following drawings.

Like reference numerals are used in the drawings to denote like elements and features.

DETAILED DESCRIPTION OF VARIOUS EMBODIMENTS

Figure 1:
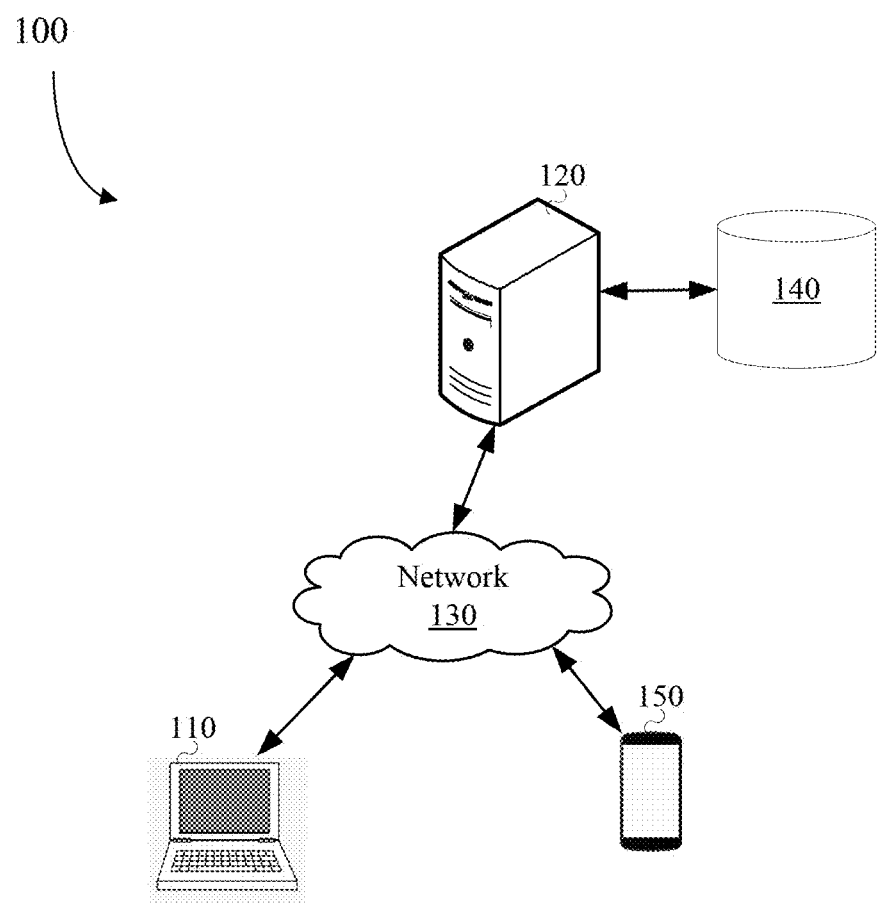
FIG. 1 is a schematic operation diagram illustrating an operating environment of an example embodiment.

Accordingly, in one aspect there is provided a server computer system comprising a communications module; a processor coupled with the communications module; and a memory coupled to the processor and storing processor-executable instructions which, when executed by the processor, configure the processor to store, in a database and in association with a provider of one or more incentives, data associated with at least one bulk order of incentives, the data including identifying information of a purchaser of the at least one bulk order of incentives and a unique number for each incentive; authenticate a computing device associated with the provider of the one or more incentives; obtain, from the database, at least one graphical object associated with the provider of the one or more incentives; automatically generate a customized incentive interface by populating one or more interface elements of a white label incentive interface, the customized incentive interface including at least a summary of the at least one bulk order of incentives and the at least one graphical object associated with the provider of the one or more incentives; and send, via the communications module and to the computing device associated with the provider of the one or more incentives, a signal causing the computing device to display the customized incentive interface that includes at least the summary of the at least one bulk order of incentives and the at least one graphical object associated with the provider of the one or more incentives.

In one or more embodiments, the processor-executable instructions, when executed by the processor, further configure the processor to determine a verification status of the purchaser of the at least one bulk order of incentives, wherein the customized incentive interface includes an indication of the verification status of the purchaser of the at least one bulk order of incentives.

In one or more embodiments, the customized incentive interface includes a selectable interface element for flagging the purchaser of the at least one bulk order of incentives as suspicious.

In one or more embodiments, the processor-executable instructions, when executed by the processor, further configure the processor to receive, via the communications module and from the computing device associated with the provider of the one or more incentives, a signal indicating selection of the selectable interface element for flagging the purchaser of the at least one bulk order of incentives as suspicious; and responsive to receiving the signal indicating selection of the selectable interface element for flagging the purchaser of the at least one bulk order of incentives send, via the communications module and to the computing device associated with the provider of the one or more incentives, a signal updating the customized incentive interface to identify the purchaser of the at least one bulk order of incentives as suspicious; and cancel or put on hold the at least one bulk order of incentives.

In one or more embodiments, the processor-executable instructions, when executed by the processor, further configure the processor to determine a change in the verification status of the purchaser of the at least one bulk order of incentives; and send, via the communications module and to the computing device associated with provider of the one or more incentives, a signal updating the indication of the verification status of the purchaser of the at least one bulk order of incentives based on the determined change in the verification status.

In one or more embodiments, the customized incentive interface includes a selectable interface element for viewing additional information of a particular bulk order of incentives and the processor-executable instructions, when executed by the processor, further configure the processor to receive, via the communications module and from the computing device associated with the provider of the one or more incentives, a signal indicating selection of the selectable interface element for viewing additional information of the particular bulk order of incentives; responsive to receiving the signal indicating selection of the selectable interface element for viewing additional information of the particular bulk order of incentives, obtain, from the database, the additional information of the particular bulk order of incentives; and send, via the communications module and to the computing device associated with the provider of the one or more incentives, a signal causing the device to display an interface that includes the additional information of the particular bulk order of incentives.

In one or more embodiments, the processor-executable instructions, when executed by the processor, further configure the processor to receive, via the communications module and from a computing device associated with the purchaser of the at least one bulk order of incentives, a signal that includes a request to purchase the at least one bulk order of incentives; and responsive to receiving the request to purchase the at least one bulk order of incentives, generate the unique number for each incentive.

In one or more embodiments, at least a portion of the unique number for each incentive is generated using a random number generator.

In one or more embodiments, the processor-executable instructions, when executed by the processor, further configure the processor to obtain electronic addresses of a plurality of computing devices associated with recipients of at least one incentive of the at least one bulk order of incentives; and send, via the communications module and to the electronic addresses of the plurality of computing devices associated with the recipients of at least one incentive of the at least one bulk order of incentives, a signal that includes the at least one incentive.

In one or more embodiments, the processor-executable instructions, when executed by the processor, further configure the processor to generate a unique code for each incentive; and send, via the communications module and to the electronic addresses of the plurality of computing devices associated with the recipients of the at least one incentive of the at least one bulk order of incentives, a signal that includes the unique code for each incentive, wherein the unique code is sent as a separate communication than the at least one incentive and is different than the unique number for each purchased incentive.

According to another aspect there is provided a computer-implemented method executed by a processor of a computer server system, the method comprising storing, in a database and in association with a provider of one or more incentives, data associated with at least one bulk order of incentives, the data including identifying information of a purchaser of the at least one bulk order of incentives and a unique number for each incentive; authenticating a computing device associated with the provider of the one or more incentives; obtaining, from the database, at least one graphical object associated with the provider of the one or more incentives; and automatically generating a customized incentive interface by populating one or more interface elements of a white label incentive interface, the customized incentive interface including at least a summary of the at least one bulk order of incentives and the at least one graphical object associated with the provider of the one or more incentives; and sending, via a communications module and to the computing device associated with the provider of the one or more incentives, a signal causing the computing device to display the customized incentive interface that includes at least the summary of the at least one bulk order of incentives and the at least one graphical object associated with the provider of the one or more incentives.

In one or more embodiments, the method further comprises determining a verification status of the purchaser of the at least one bulk order of incentives, wherein the customized incentive interface includes an indication of the verification status of the purchaser of the at least one bulk order of incentives.

In one or more embodiments, the customized incentive interface includes a selectable interface element for flagging the purchaser of the at least one bulk order of incentives as suspicious.

In one or more embodiments, the method further comprises receiving, via the communications module and from the computing device associated with the provider of the one or more incentives, a signal indicating selection of the selectable interface element for flagging the purchaser of the at least one bulk order of incentives as suspicious; and responsive to receiving the signal indicating selection of the selectable interface element for flagging the purchaser of the at least one bulk order of incentives: sending, via the communications module and to the computing device associated with the provider of the one or more incentives, a signal updating the customized incentive interface to identify the purchaser of the at least one bulk order of incentives as suspicious; and cancelling or putting on hold the at least one bulk order of incentives.

In one or more embodiments, the method further comprises determining a change in the verification status of the purchaser of the at least one bulk order of incentives; and sending, via the communications module and to the computing device associated with provider of the one or more incentives, a signal updating the indication of the verification status of the purchaser of the at least one bulk order of incentives based on the determined change in the verification status.

In one or more embodiments, the customized incentive interface includes a selectable interface element for viewing additional information of a particular bulk order of incentives and the method further comprises receiving, via the communications module and from the computing device associated with the provider of the one or more incentives, a signal indicating selection of the selectable interface element for viewing additional information of the particular bulk order of incentives; responsive to receiving the signal indicating selection of the selectable interface element for viewing additional information of the particular bulk order of incentives, obtaining, from the database, the additional information of the particular bulk order of incentives; and sending, via the communications module and to the computing device associated with the provider of the one or more incentives, a signal causing the device to display an interface that includes the additional information of the particular bulk order of incentives.

In one or more embodiments, the method further comprises receiving, via the communications module and from a computing device associated with the purchaser of the at least one bulk order of incentives, a signal that includes a request to purchase the at least one bulk order of incentives; and responsive to receiving the request to purchase the at least one bulk order of incentives, generating the unique number for each incentive.

In one or more embodiments, the method further comprises obtaining electronic addresses of a plurality of computing devices associated with recipients of at least one incentive of the at least one bulk order of incentives; and sending, via the communications module and to the electronic addresses of the plurality of computing devices associated with the recipients of at least one incentive of the at least one bulk order of incentives, a signal that includes the at least one incentive.

In one or more embodiments, the method further comprises generating a unique code for each incentive; and sending, via the communications module and to the electronic addresses of the plurality of computing devices associated with the recipients of the at least one incentive of the at least one bulk order of incentives, a signal that includes the unique code for each incentive, wherein the unique code is sent as a separate communication than the at least one incentive and is different than the unique number for each purchased incentive.

According to another aspect there is provided a non-transitory computer readable storage medium comprising computer-executable instructions which, when executed, configure a processor to store, in a database and in association with a provider of one or more incentives, data associated with at least one bulk order of incentives, the data including identifying information of a purchaser of the at least one bulk order of incentives and a unique number for each incentive; authenticate a computing device associated with the provider of the one or more incentives; obtain, from the database, at least one graphical object associated with the provider of the one or more incentives; automatically generate a customized incentive interface by populating one or more interface elements of a white label incentive interface, the customized incentive interface including at least a summary of the at least one bulk order of incentives and the at least one graphical object associated with the provider of the one or more incentives; and send, via a communications module and to the computing device associated with the provider of the one or more incentives, a signal causing the computing device to display the customized incentive interface that includes at least the summary of the at least one bulk order of incentives and the at least one graphical object associated with the provider of the one or more incentives.

Other aspects and features of the present application will be understood by those of ordinary skill in the art from a review of the following description of examples in conjunction with the accompanying figures.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

In the present application, examples involving a general-purpose computer, aspects of the disclosure transform the general-purpose computer into a special-purpose computing device when configured to execute the instructions described herein.

FIG. 1 is a schematic operation diagram illustrating an operating environment of an example embodiment. As shown, the system 100 includes a computing device 110 and a server computer system 120 coupled to one another through a network 130, which may include a public network such as the Internet and/or a private network. The computing device 110 and the server computer system 120 may be in geographically disparate locations. Put differently, the computing device 110 and the server computer system 120 may be located remote from one another.

The computing device 110 may be a laptop computer as shown in FIG. 1. However, the computing device 110 may be a computing device of another type such as for example a smartphone, personal computer, a tablet computer, a notebook computer, a hand-held computer, a personal digital assistant, a portable navigation device, a mobile phone, a wearable computing device (e.g., a smart watch, a wearable activity monitor, wearable smart jewelry, and glasses and other optical devices that include optical head-mounted displays), an embedded computing device (e.g., in communication with a smart textile or electronic fabric), and any other type of computing device that may be configured to store data and software instructions, and execute software instructions to perform operations consistent with disclosed embodiments.

The server computer system 120 is a computer server system. A computer server system may, for example, be a mainframe computer, a minicomputer, or the like. In some implementations thereof, a computer server system may be formed of or may include one or more computing devices. A computer server system may include and/or may communicate with multiple computing devices such as, for example, database servers, computer servers, and the like. Multiple computing devices such as these may be in communication using a computer network and may communicate to act in cooperation as a computer server system. For example, such computing devices may communicate using a local-area network (LAN). In some embodiments, a computer server system may include multiple computing devices organized in a tiered arrangement. For example, a computer server system may include middle tier and back-end computing devices. In some embodiments, a computer server system may be a cluster formed of a plurality of interoperating computing devices.

The network 130 is a computer network. In some embodiments, the network 130 may be an internetwork such as may be formed of one or more interconnected computer networks. For example, the network 130 may be or may include an Ethernet network, an asynchronous transfer mode (ATM) network, a wireless network, a telecommunications network, or the like.

The computing device 110 is associated with a requesting party and may be adapted to send, to the server computer system 120, web requests. As will be described in more detail below, the web requests may include a web request to send one or more incentives. The incentives may include, for example, physical gift cards, digital gift cards, loyalty point multipliers, etc.

The server computer system 120 may be a financial institution server and may maintain a database 140 that includes various data records. At least some of the data records may be associated with customer bank accounts and/or customer credit card accounts. For example, a data record may reflect an amount of value stored in a customer's bank account. As another example, a data record may store transaction data associated with one or more transactions made on a credit card. The transaction data may include information related to one or more transactions such as for example a transaction location, a transaction date, a transaction amount, etc. At least some of the data records may include additional account data such as for example the name, age, address of the customer, etc. and the account data may be associated with the customer bank accounts and/or customer credit card accounts. The account data may additionally include information relating to incentives or digital incentives previously accepted by a customer. For example, the information may identify the amount of the digital incentive, the type of the digital incentive, and the digital format that was used to send the digital incentive to the customer.

It will be appreciated that the amount of data stored in the database may be referred to as big data. For example, the database 140 may store transaction data for every transaction made by every customer of the financial institution. The amount of data may be too large or complex to be dealt with by traditional data-processing application software. As such, in one or more embodiments, the server computer system 120 may engage a data mining module to analyze the account data to generate at least one recommendation for sending a digital incentive.

The server computer system 120 may communicate with the database 140 directly or through the network 130.

The server computer system 120 may communicate with one or more additional computing devices 150. Specifically, the server computer system 120 may send and receive signals with the additional computing devices 150 and at least some of the signals may include a customized incentive interface that is to be displayed on the one or more additional computing device 150. Although only one additional computing device 150 is shown in FIG. 1, a plurality of computing devices 150 may communicate with the server computer system 120 and each additional computing device 150 may be associated with a customer of the financial institution. Each additional computing device 150 may be, for example, a laptop, a smartphone, personal computer, a tablet computer, a notebook computer, a hand-held computer, a personal digital assistant, a portable navigation device, a mobile phone, a wearable computing device (e.g., a smart watch, a wearable activity monitor, wearable smart jewelry, and glasses and other optical devices that include optical head-mounted displays), an embedded computing device (e.g., in communication with a smart textile or electronic fabric), and any other type of computing device that may be configured to store data and software instructions, and execute software instructions to perform operations consistent with disclosed embodiments.

Figure 2:
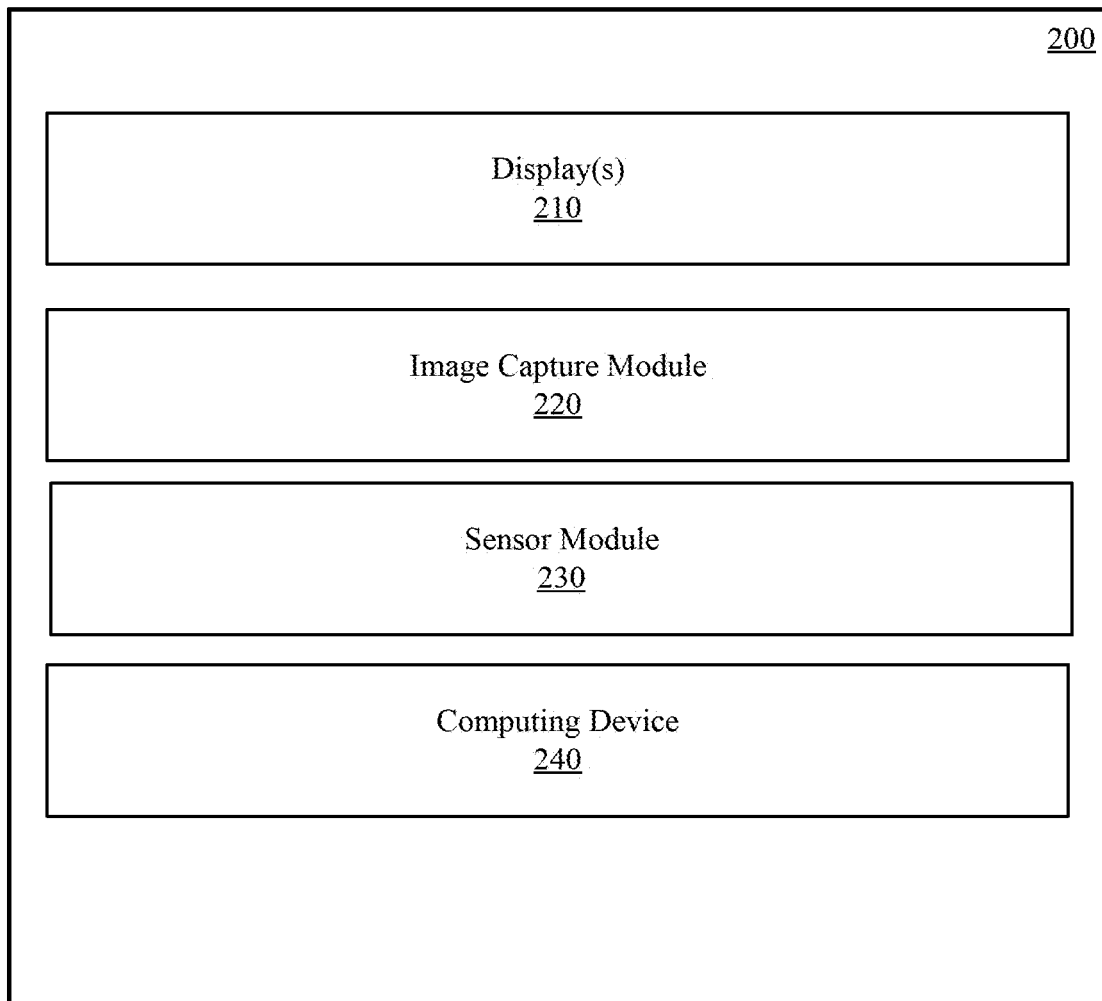
FIG. 2 is a simplified schematic diagram showing components of a computing device.

FIG. 2 is a simplified schematic diagram showing components of an exemplary computing device 200. The computing device 110 and the one or more additional computing devices 150 may be of the same type as computing device 200. The computing device 200 may include modules including, as illustrated, for example, one or more displays 210, an image capture module 220, a sensor module 230, and a computer device 240.

The one or more displays 210 are a display module. The one or more displays 210 are used to display screens of a graphical user interface that may be used, for example, to communicate with the server computer system 120 (FIG. 1). The one or more displays 210 may be internal displays of the computing device 200 (e.g., disposed within a body of the computing device).

The image capture module 220 may be or may include a camera. The image capture module 220 may be used to obtain image data, such as images. The image capture module 220 may be or may include a digital image sensor system as, for example, a charge coupled device (CCD) or a complementary metal-oxide-semiconductor (CMOS) image sensor.

The sensor module 230 may be a sensor that generates sensor data based on a sensed condition. By way of example, the sensor module 230 may be or include a location subsystem which generates location data indicating a location of the computing device 200. The location may be the current geographic location of the computing device 200. The location subsystem may be or include any one or more of a global positioning system (GPS), an inertial navigation system (INS), a wireless (e.g., cellular) triangulation system, a beacon-based location system (such as a Bluetooth low energy beacon system), or a location subsystem of another type.

The computer device 240 is in communication with the one or more displays 210, the image capture module 220, and the sensor module 230. The computer device 240 may be or may include a processor which is coupled to the one or more displays 210, the image capture module 220, and/or the sensor module 230.

Figure 3:
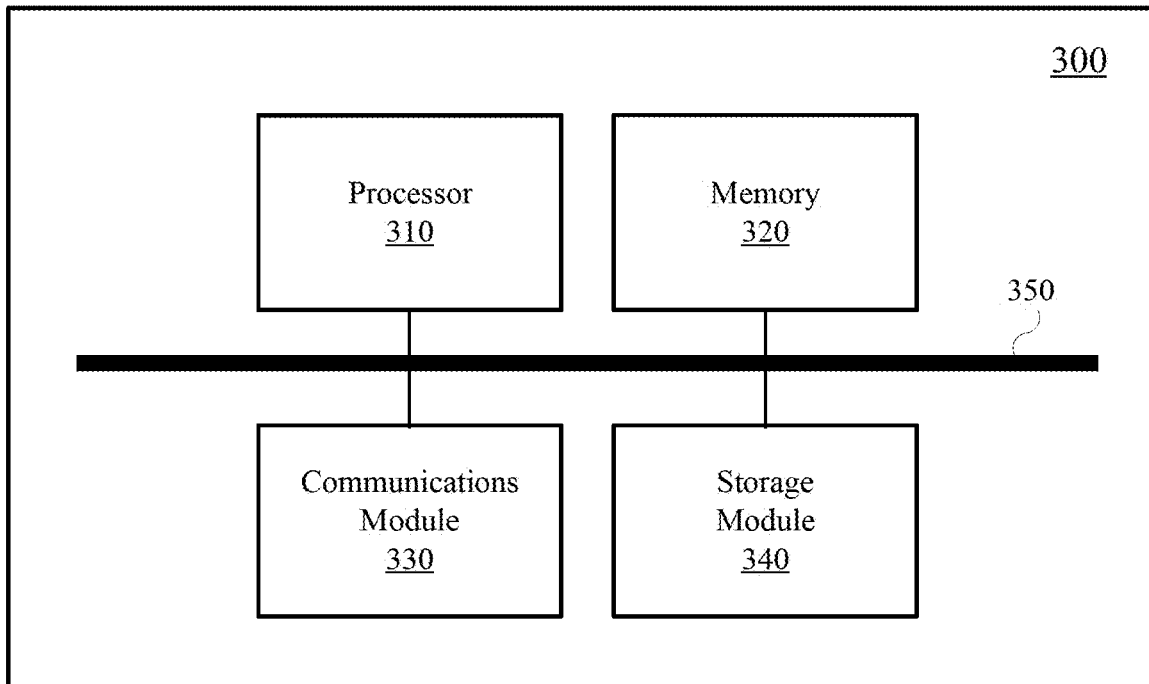
FIG. 3 is a high-level schematic diagram of an example computer device.

Referring now to FIG. 3, a high-level operation diagram of an example computer device 300 is shown. In some embodiments, the computer device 300 may be exemplary of the computer device 240 (FIG. 2) and/or server computer system 120.

The example computer device 300 includes a variety of modules. For example, as illustrated, the example computer device 300 may include a processor 310, a memory 320, a communications module 330, and/or a storage module 340. As illustrated, the foregoing example modules of the example computer device 300 are in communication over a bus 350.

The processor 310 is a hardware processor. The processor 310 may, for example, be one or more ARM, Intel x86, PowerPC processors or the like.

The memory 320 allows data to be stored and retrieved. The memory 320 may include, for example, random access memory, read-only memory, and persistent storage. Persistent storage may be, for example, flash memory, a solid-state drive or the like. Read-only memory and persistent storage are non-transitory computer-readable storage mediums. A computer-readable medium may be organized using a file system such as may be administered by an operating system governing overall operation of the example computer device 300.

The communications module 330 allows the example computer device 300 to communicate with other computer or computing devices and/or various communications networks. For example, the communications module 330 may allow the example computer device 300 to send or receive communications signals. Communications signals may be sent or received according to one or more protocols or according to one or more standards. For example, the communications module 330 may allow the example computer device 300 to communicate via a cellular data network, such as for example, according to one or more standards such as, for example, Global System for Mobile Communications (GSM), Code Division Multiple Access (CDMA), Evolution Data Optimized (EVDO), Long-term Evolution (LTE) or the like. Additionally or alternatively, the communications module 330 may allow the example computer device 300 to communicate using near-field communication (NFC), via Wi-Fi™, using Bluetooth™ or via some combination of one or more networks or protocols. In some embodiments, all or a portion of the communications module 330 may be integrated into a component of the example computer device 300. For example, the communications module may be integrated into a communications chipset. In some embodiments, the communications module 330 may be omitted such as, for example, if sending and receiving communications is not required in a particular application.

The storage module 340 allows the example computer device 300 to store and retrieve data. In some embodiments, the storage module 340 may be formed as a part of the memory 320 and/or may be used to access all or a portion of the memory 320. Additionally or alternatively, the storage module 340 may be used to store and retrieve data from persisted storage other than the persisted storage (if any) accessible via the memory 320. In some embodiments, the storage module 340 may be used to store and retrieve data in a database. A database may be stored in persisted storage. Additionally or alternatively, the storage module 340 may access data stored remotely such as, for example, as may be accessed using a local area network (LAN), wide area network (WAN), personal area network (PAN), and/or a storage area network (SAN). In some embodiments, the storage module 340 may access data stored remotely using the communications module 330. In some embodiments, the storage module 340 may be omitted and its function may be performed by the memory 320 and/or by the processor 310 in concert with the communications module 330 such as, for example, if data is stored remotely. The storage module may also be referred to as a data store.

Software comprising instructions is executed by the processor 310 from a computer-readable medium. For example, software may be loaded into random-access memory from persistent storage of the memory 320. Additionally or alternatively, instructions may be executed by the processor 310 directly from read-only memory of the memory 320.

Figure 4:
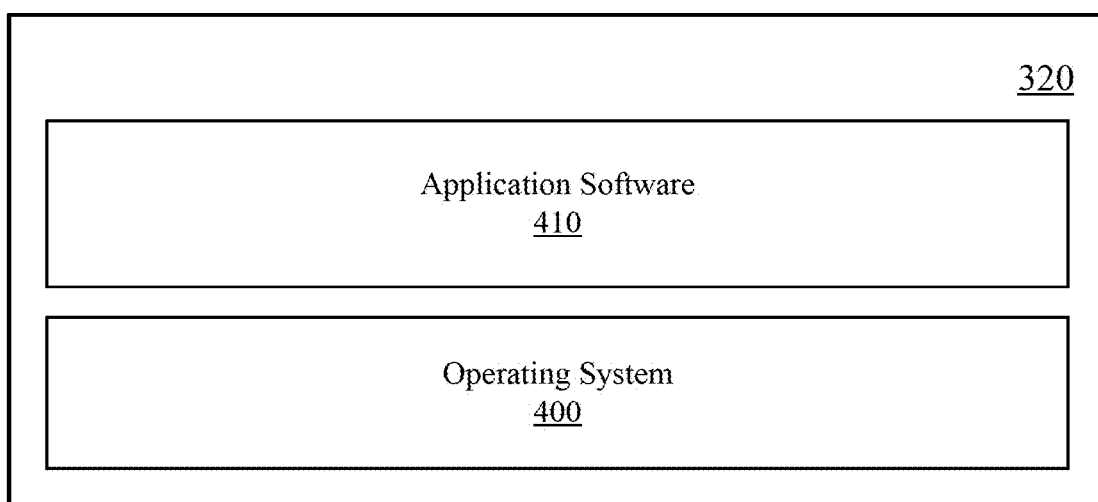
FIG. 4 shows a simplified organization of software components stored in a memory of the example computer device of FIG. 3.

FIG. 4 depicts a simplified organization of software components stored in the memory 320 of the example computer device 300 (FIG. 3). As illustrated, these software components include an operating system 400 and an application 410.

The operating system 400 is software. The operating system 400 allows the application 410 to access the processor 310 (FIG. 3), the memory 320, and the communications module 330 of the example computer device 300 (FIG. 3). The operating system 400 may be, for example, Google™ Android™, Apple™ iOS™, UNIX™, Linux™, Microsoft™ Windows™, Apple OSX™ or the like.

The application 410 adapts the example computer device 300, in combination with the operating system 400, to operate as a device performing a particular function. For example, the application 410 may cooperate with the operating system 400 to adapt a suitable embodiment of the example computer device 300 to operate as the computer device 240 (FIG. 2) and/or the server computer system 120.

While a single application 410 is illustrated in FIG. 3, in operation the memory 320 may include more than one application 410 and different applications 410 may perform different operations. For example, in at least some embodiments in which the computer device 300 is functioning as the computing device 110, the applications 410 may include an incentive management application. The incentive management application may be provided as a web application and/or a mobile application. The incentive management application may be configured to present one or more graphical user interfaces on a display of the computing device 110 and may provide various incentive management functions.

The incentive management application may require a requesting party to authenticate. For example, the incentive management application may be accessed on the computing device 110 via an internet web browser and may require the user of the computing device 110 (also referred to as the requesting party) to create an account. Account creation may require the submission of credentials to be used for authentication such as for example a username and a password. The username may include the requesting party's email address. Additional information may be required to complete account creation such as for example a company name, etc. It will be appreciated that in one or more embodiments the incentive management application may be downloaded or resident on the computing device 110 and thus may be accessed directly thereon.

To access the incentive management application on the computing device 110, the requesting party may be prompted to enter the credentials submitted during the account creation. For example, the requesting party may be prompted to submit a username and a password associated with their account. In response to receiving the credentials, the server computer system 120 may authenticate the computing device 110 (or user) and may identify an account associated therewith.

Within the incentive management application, a graphical user interface may be displayed on a display screen of the computing device 110 that may include one or more selectable interface elements for submitting additional information and/or objects. For example, a selectable interface element for uploading or submitting one or more graphical objects associated with the requesting party may be displayed. The graphical objects may include company logos, digital gift card skins, animated objects, etc. In response to selecting the selectable interface element, a graphical user interface may be displayed that includes one or more selectable interface elements for uploading or submitting the one or more graphical objects. The requesting party may select one of the selectable interface elements which may prompt the user to select a particular file or web address that includes the graphical object. In this manner, graphical objects may be submitted by the requesting party using the computing device 110 and stored in the database 140 by the server computer system 120. As will be described in more detail below, the server computer system 120 may analyze the uploaded graphical objects to label or categorize each uploaded graphical object. Alternatively, the requesting party may be prompted to label or categorize each uploaded graphical object.

As another example, a selectable interface element for uploading or submitting a list of electronic addresses that are to receive the one or more digital incentives may be displayed. The list of electronic addresses may include, for example, email addresses, telephone numbers, unique identifiers of computing devices, etc. In response to selecting the selectable interface element, a graphical user interface may be displayed that includes one or more selectable interface elements for uploading or submitting the list of electronic addresses. The requesting party may select one or more digital files that include the list of electronic addresses and the digital files may be in a standardized format such as for example a comma-separated values (CSV) file format.

The incentive management application may present one or more graphical user interfaces on the computing device 110 that allow a requesting party to submit a request to automatically send one or more digital incentives. In response to receiving the request to send one or more digital incentives, a customized incentive interface may be generated and sent to one or more electronic addresses.

Figure 5:
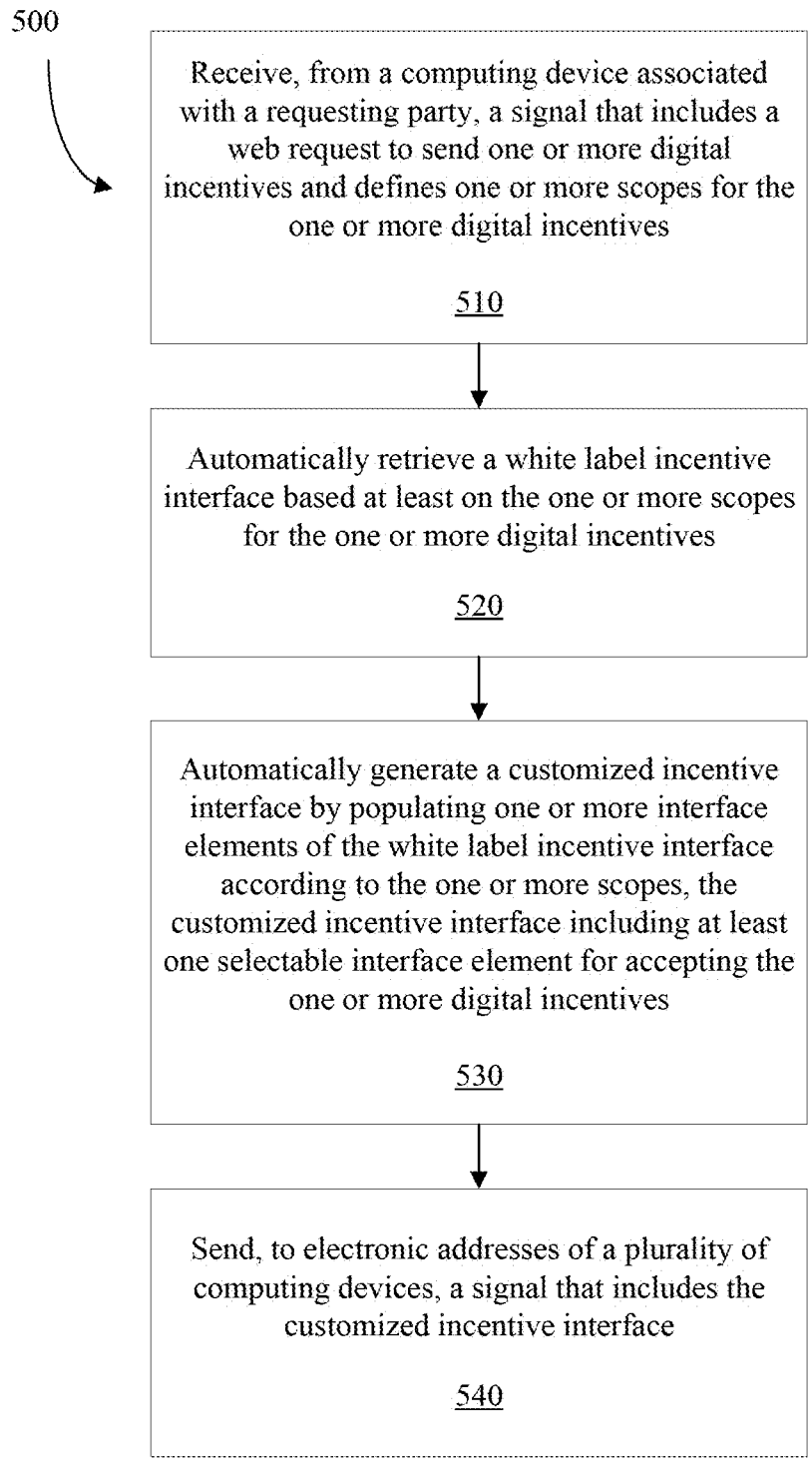
FIG. 5 is a flowchart showing operations performed by a server computer system in automatically generating a customized incentive interface according to an embodiment.

Reference is made to FIG. 5, which illustrates, in flowchart form, a method 500 for generating a customized incentive interface. The method 500 may be implemented by a computing device having suitable processor-executable instructions for causing the computing device to carry out the described operations. The method 500 may be implemented, in whole or in part, by the server computer system 120.

The method 500 includes receiving, from a computing device associated with a requesting party, a signal that includes a web request to send one or more digital incentives and defines one or more scopes for the one or more digital incentives (step 510).

In one or more embodiments, the web request to send one or more digital incentives may include or may define one or more scopes for the one or more digital incentives. The scopes may be defined by the requesting party within the incentive management application. For example, the incentive management application may display, on the computing device 110, a graphical user interface that includes one or more interface elements for defining the scopes for the one or more digital incentives. The interface elements may include, for example, selectable interface elements (selectable buttons, radio buttons, toggle buttons, etc.), input fields, etc. and may be selected or completed by the requesting party using, for example, an input device of the computing device 110.

The one or more scopes may include, for example, a type of each digital incentive. For example, the type of a digital incentive may include a digital gift card, a loyalty point multiplier, etc. The one or more scopes may additionally define an amount of the digital incentive. For example, the digital incentive type may include the digital gift card and the amount of the digital incentive may include, for example, $5, $10, etc. As another example, the digital incentive type may include the loyalty point multiplier and the amount of the digital incentive may include, for example, 2×, 3×, 5× etc. It will be appreciated that the loyalty point multiplier may be an amount of loyalty points earned per dollar spent. For example, the amount of the digital incentive may include 5× and as such for every $1 spent at a particular merchant the digital incentive may allow a recipient of the digital incentive to earn five (5) loyalty points. It will be appreciated that the request to send one or more digital incentives may include a request to send multiple digital incentives and each digital incentive may be of a different type or a different value.

The one or more scopes may include parameters for each digital incentive. For example, the parameters may define where the digital incentive may be used such as for example a particular merchant or category of merchants. As one example, the parameters of a particular digital incentive may define that the digital incentive may be used at a Merchant A and the parameters of another digital incentive may define that the digital incentive may be used at a Merchant B.

It will be appreciated that the requesting party itself may be the merchant where the digital incentive may be used. For example, the requesting party may be a particular grocery store and as such the digital incentives may be used only at the particular grocery store.

The one or more scopes may include one or more text fields that are to be used when sending the one or more digital incentives. The one or more text fields may be customized or entered by the requesting party. Additionally or alternatively, within the incentive management application, the server computer system 120 may cause the computing device 110 to display a number of predefined text fields that may be selected by the requesting party. The predefined text fields may include messages relating to sending digital incentives such as for example "You have received an offer of a digital gift card" and the requesting party may select one or more of the predefined text fields that are to be used.

The one or more scopes may additionally define who is to receive the one or more digital incentives. For example, as mentioned previously, the requesting party may upload a list of electronic addresses that are to receive the one or more digital incentives. In one example, the requesting party may upload a first list defining a first segment that is to receive a first digital incentive and may upload a second list defining a second segment that is to receive a second digital incentive.

The one or more scopes may include a request that the server computer system 120 generate recommendations for who should receive the one or more digital incentives. For example, the requesting party may select a selectable option requesting that the server computer system 120 generate recommendations for who should receive the one or more digital incentives. Examples of how the server computer system 120 may generate the recommendations will be described in more detail below.

The requesting party may upload a list of electronic addresses that are to receive the one or more digital incentives and may request that the server computer system 120 generate recommendations for who should receive the one or more digital incentives. For example, the requesting party may upload a first list defining a first segment that is to receive a first digital incentive and may request that the server computer system 120 generate recommendations for who should also receive the first digital incentive or may request that the server computer system 120 generate recommendations for who should receive a second digital incentive.

The one or more scopes may additionally include a selection of one or more graphical objects to be used when sending the one or more digital incentives. For example, as mentioned, within the incentive management application, the user may have previously uploaded or submitted one or more graphical objects associated with the requesting party where the one or more graphical objects may include company logos, digital gift card skins, animated objects etc. As when, when defining the one or more scopes, the computing device 110 may display one or more of the graphical objects and the requesting party may select one or more of the graphical objects to be used.

In one or more embodiments, the server computer system 120 may have automatically labelled each uploaded graphical object and as such the server computer system 120 may cause the computing device 110 to display all uploaded graphical objects that have the same label and may request that the requesting party select one of the graphical objects. For example, the requesting party may have uploaded five (5) different digital gift card skins and the server computer system 120 may cause the computing device 110 to display the five (5) different digital gift card skins and may request that the requesting party select one of the digital gift card skins. Of course, in embodiments where the web request includes a request to send two different gift cards, the server computer system 120 may request that the requesting party select two of the digital gift card skins.

In one or more embodiments, the server computer system 120 may have automatically labelled each uploaded graphical object and as such the server computer system 120 may not require selection of the one or more graphical objects by the requesting party. For example, the requesting party may have uploaded a single digital gift card skin and as such the server computer system 120 may not require the requesting party to select the single digital gift card skin.

The one or more scopes may additionally define a digital format for sending the one or more digital incentives. For example, the digital incentives may be sent via email, text message, or may be sent such that they are displayed as a notification and the digital format may correspond to how the digital incentives are to be sent.

Once the user has completed defining the one or more scopes, the requesting party may select a selectable interface element to submit the web request and in response a signal may be sent to the server computer system 120 that includes the web request.

In response to receiving the web request, the method 500 includes automatically retrieving a white label incentive interface based at least on the one or more scopes for the one or more digital incentives (step 520).

The server computer system 120 receives the web request to send one or more digital incentives and based on the one or more scopes for the one or more digital incentives, may automatically retrieve a white label incentive interface. In one or more embodiments, server computer system 120 may store one or more white label incentive interfaces in the database 140. The white label incentive interfaces may have different digital formats based on whether they are being sent via email, text message, or whether they are to be displayed as a notification.

The one or more scopes may include a request to send a digital incentive in the form of a $5 gift card via email and as such the server computer system 120 may retrieve a white label incentive interface associated with sending a single gift card. As another example, the one or more scopes may include a request to send two digital incentives via email where a first digital incentive is in the form of a $5 gift card for Merchant A and a second digital incentive is in the form of a $10 gift card for Merchant B and as such the server computer system 120 may retrieve a white label incentive interface associated with sending two gift cards.

Figure 6:
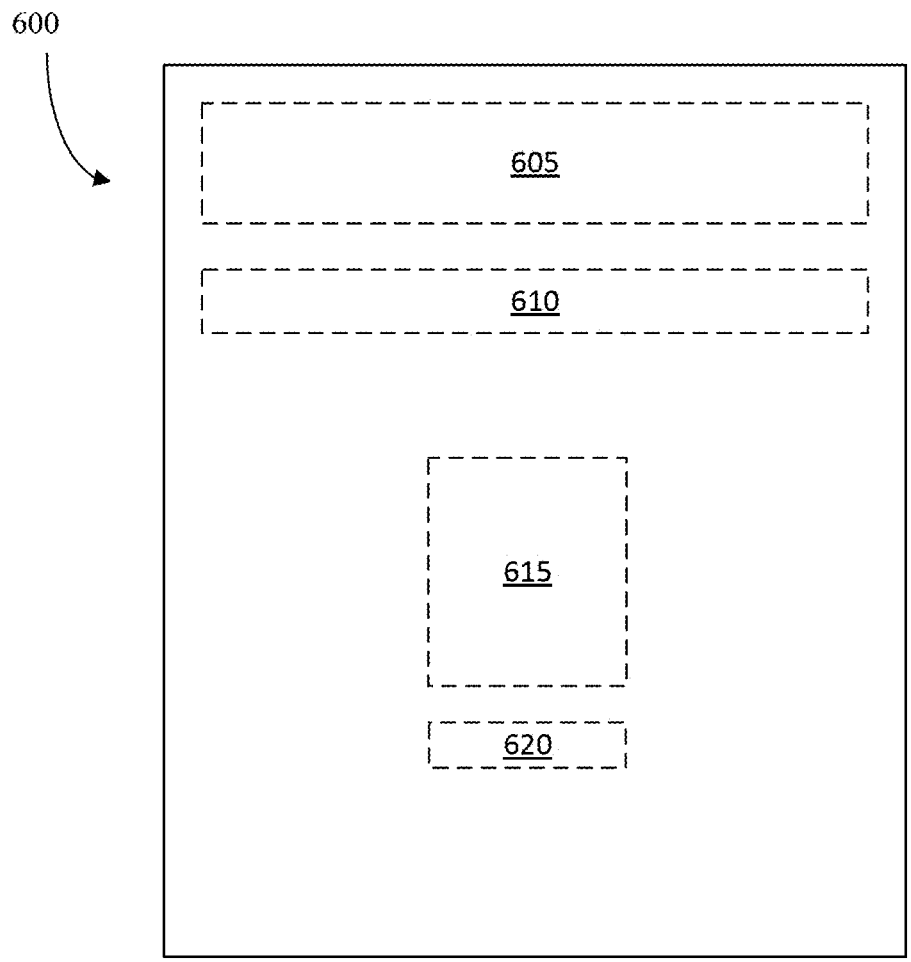
FIG. 6 shows an example white label incentive interface according to an embodiment.

An example white label incentive interface 600 is shown in FIG. 6. The white label incentive interface 600 may be in a digital format to be sent via email. The white label incentive interface 600 may be a white label incentive interface associated with sending a single digital incentive. The white label incentive interface 600 includes a first interface element 605, a second interface element 610, a third interface element 615 and a fourth interface element 620. The various interface elements are fixed in position relative to one another and this may be defined in metadata of the white label incentive interface 600. Each interface element may include a tag such as for example "logo", "header", "title", "message", "digital incentive", "selectable element", etc. and this may be defined in the metadata. The tag may be used to populate each interface element.

Figure 7:
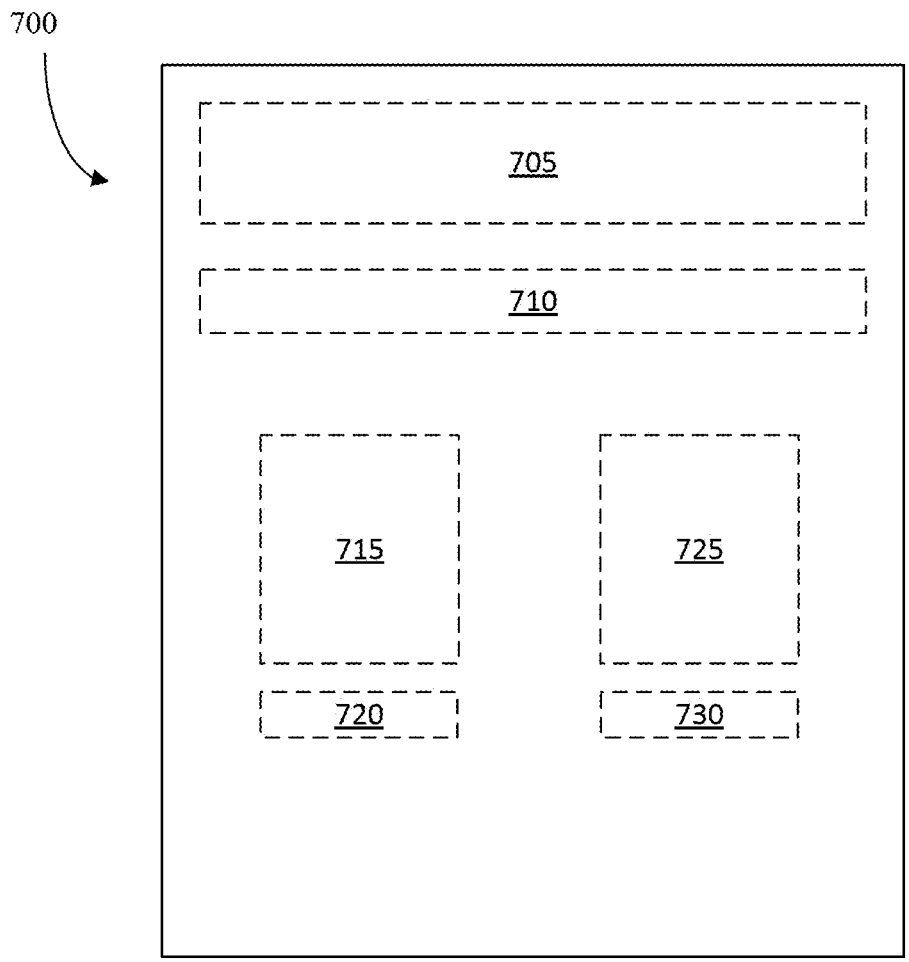
FIG. 7 shows another example white label incentive interface according to an embodiment.

Another example white label incentive interface 700 is shown in FIG. 7. The white label incentive interface 700 may be in a digital format to be sent via email. The white label incentive interface 700 may be a white label incentive interface associated with sending two (2) digital incentives. The white label incentive interface 700 includes a first interface element 705, a second interface element 710, a third interface element 715, a fourth interface element 720, a fifth interface element 725 and a sixth interface element 730. The various interface elements are fixed in position relative to one another and this may be defined in metadata of the white label incentive interface 700. Each interface element may include a tag such as for example "logo", "header", "title", "message", "digital incentive", "selectable element", etc. and this may be defined in the metadata. The tag may be used to populate each interface element.

The method 500 includes, using the white label incentive interface, automatically generating a customized incentive interface by populating one or more interface elements of the white label incentive interface according to the one or more scopes, the customized incentive interface including at least one selectable interface element for accepting the one or more digital incentives (step 530).

The server computer system 120 may populate various interface elements of the retrieved white label incentive interface according to the one or more scopes for the one or more digital incentives to automatically generate the customized incentive interface.

As one example, the white label incentive interface 600 may be used by the server computer system 120 to automatically generate a customized incentive interface. For example, the interface element 605 may be tagged as "logo" and as such the server computer system 120 may obtain, from the one or more scopes, a graphical object that has been selected by the user and is labelled or tagged as a company logo. The server computer system 120 may automatically populate the interface element 605 using the graphical object.

In one or more embodiments, the server computer system 120 may determine that no graphical object has been uploaded by the requesting party and as such the server computer system 120 may engage an application programming interface (API) to obtain a graphical object associated with the requesting party. For example, the server computer system 120 may send an API request to an API associated with obtaining images that includes identifying information of the requesting party and may receive, from the API associated with obtaining images, a graphical object associated with the requesting party. The server computer system 120 may use the graphical object to populate the interface element 605, for example.

The server computer system 120 may obtain, from the one or more scopes, one or more text fields that are to be used. For example, the interface element 610 may be tagged as "header", "title" or "message" and as such the server computer system 120 may obtain one or more text fields from the one or more scopes and may automatically populate the interface element 610 using the one or more text fields.

In one or more embodiments, the server computer system 120 may determine that the one or more scopes do not include any text fields and as such the server computer system 120 may select a default text field that is to be used to populate the interface element 610.

The server computer system 120 may obtain, from the one or more scopes, a graphical object that has been selected by the user and is labelled or tagged as a digital gift card skin. The interface element 615 may be tagged as "digital incentive" and as such the digital gift card skin may be used to automatically populate the interface element 615.

Figure 8:
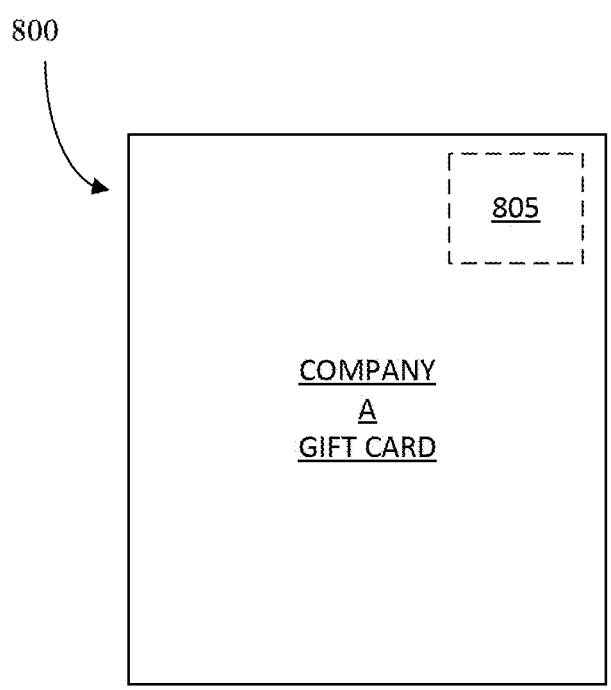
FIG. 8 shows a digital gift card skin according to an embodiment.

It will be appreciated that the digital gift card skin itself may have an interface element that is to be populated and the server computer system 120 may automatically populate the interface element based on the one or more scopes. An example digital gift card skin 800 is shown in FIG. 8. As can be seen, the digital gift card skin 800 includes an interface element 805 that is to be populated by the server computer system 120 to indicate the value of the digital gift card based on the one or more scopes. In one example, the one or more scopes may define the digital gift card as a $5 digital gift card and as such the server computer system 120 may populate the interface element 805 the digital gift card skin 800 with "$5" and as such, a digital gift card may be automatically generated by the server computer system 120 that indicates the value of the gift card based on the one or more scopes.

In one or more embodiments, the server computer system 120 may determine that no graphical object has been uploaded by the requesting party that has be labelled as "digital incentive" and as such the server computer system 120 may engage an application programming interface (API) to obtain a graphical object associated with the requesting party and may automatically generate a digital incentive skin such as a digital gift card skin. For example, the server computer system 120 may obtain a default digital gift card skin and may populate an interface element with the graphical object associated with the requesting party and in this manner the digital gift card skin may be automatically customized for the requesting party.

The interface element 620 may be tagged as "selectable element" and as such the server computer system 120 may populate the interface element 620 to be a selectable interface element that, when selected, accepts the digital incentive.

Figure 9:
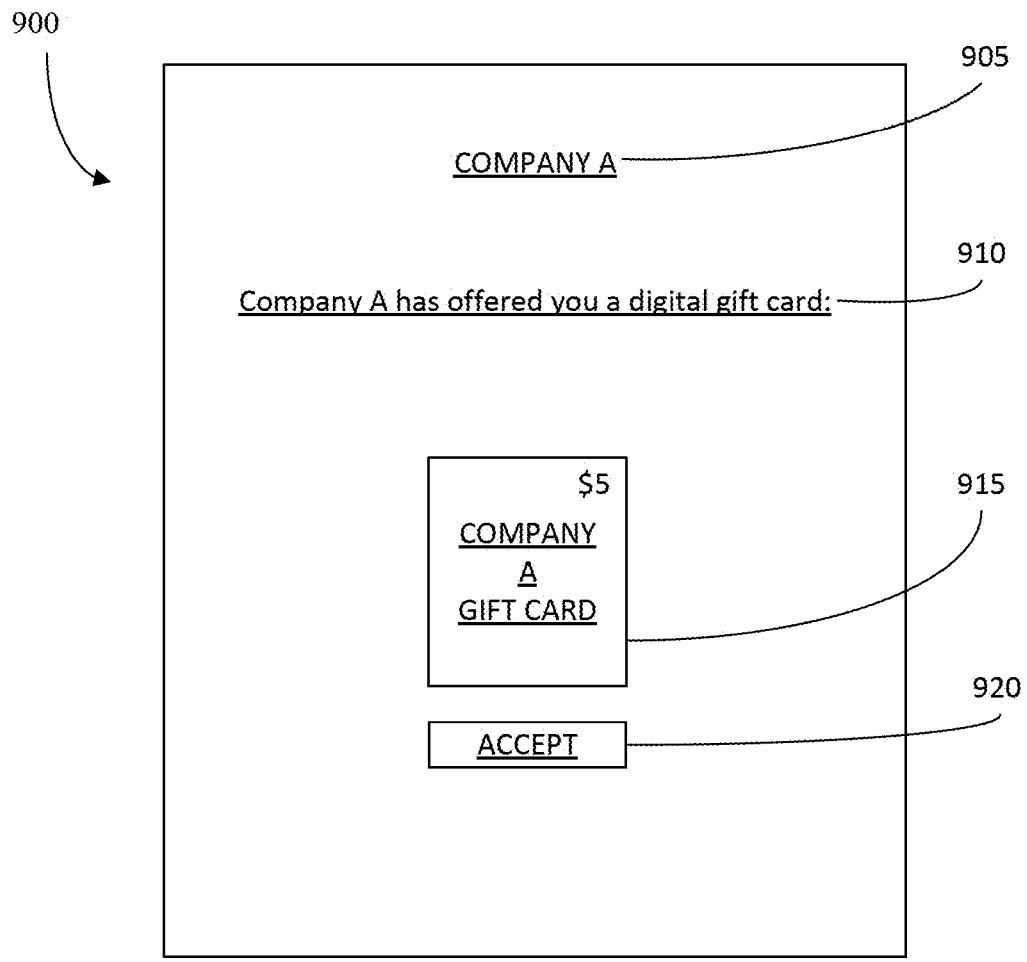
FIG. 9 shows a customized incentive interface generated using the example white label incentive interface of FIG. 6 according to an embodiment.

A customized incentive interface 900 automatically generated by the server computer system 120 using the white label incentive interface 600 is shown in FIG. 9. As can be seen, the customized incentive interface 900 includes a company logo 905, a message 910, a digital gift card 915 (with a populated interface element indicating that the digital gift card is a $5 gift card), and a selectable interface element 920 that, when selected, accepts the digital incentive.

The method 500 includes sending, to electronic addresses of a plurality of computing devices, a signal that includes the customized incentive interface (step 540).

As mentioned, the one or more scopes may define who is to receive the one or more digital incentives (or the customized incentive interface). For example, the requesting party may upload a list of electronic addresses that are to receive the one or more digital incentives. The electronic addresses may include email addresses, telephone numbers, unique identifiers of computing devices, etc. The server computer system 120 may obtain the electronic addresses from the list and may send, to the electronic addresses, a signal that includes the customized incentive interface.

The one or more scopes may include a request that the server computer system 120 generate recommendations for who should receive the one or more digital incentives. The server computer system 120 may obtain data that is not available to the requesting party, such as for example data from the database 140, to generate the recommendations.

Figure 10:
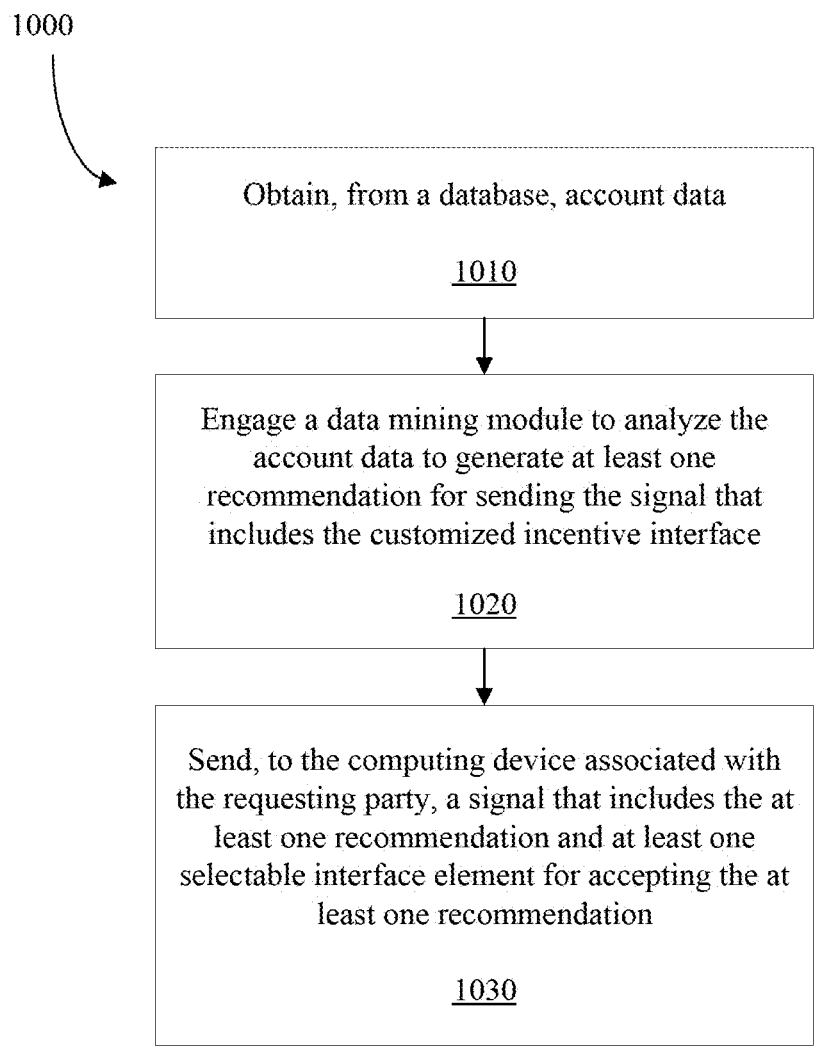
FIG. 10 is a flowchart showing operations performed by a server computer system for generating recommendations for who should receive the one or more digital incentives according to an embodiment.

Reference is made to FIG. 10, which illustrates, in flowchart form, a method 1000 for generating recommendations for who should receive the one or more digital incentives. The method 1000 may be implemented by a computing device having suitable processor-executable instructions for causing the computing device to carry out the described operations. The method 1000 may be implemented, in whole or in part, by the server computer system 120.

The method 1000 includes obtaining, from a database, account data (step 1010).

The server computer system 120 obtains account data from the database 140. As mentioned, at least some of the data records may be associated with customer bank accounts and/or customer credit card accounts. The data records may also store transaction data associated with transactions made on a credit card. The transaction data may include information related to one or more transactions such as for example a transaction location, a transaction date, a transaction amount, etc. At least some of the data records may include additional account data such as for example the name, age, address of the customer, etc. and the account data may be associated with the customer bank accounts and/or customer credit card accounts. The account data may additionally include information relating to digital incentives previously accepted by a customer. The information may identify the amount of the digital incentive, the type of the digital incentive, and the digital format that was used to send the digital incentive to the customer.

The method 1000 includes engaging a data mining module to analyze the account data to generate at least one recommendation for sending the signal that includes the customized incentive interface (step 1020).

As mentioned, since the amount of data stored by the database 140 may be too large or complex to be dealt with by traditional data-processing application software, the server computer system 120 may engage a data mining module to analyze the account data to generate at least one recommendation for sending a digital incentive.

The data mining module may analyze the account data to identify at least one segment that is likely to accept the one or more digital incentives. In one or more embodiments, a segment may include a particular group of customers who are likely to accept the one or more digital incentives. The group of customers may share at least one common characteristic. Example characteristics may include location such as for example customers located within a same neighbourhood, city, province, state, country, etc. Example characteristics may include transactions made by the customers such as for example customers who have recently completed a transaction at a particular merchant. Example characteristics may include personal finances such as for example customers who have an annual salary above or below a certain threshold. Example characteristics may include customers who have recently accepted a digital incentive or customers who accepted a digital incentive more than a threshold amount of time ago. For example, customers may have accepted a digital incentive over one year ago. Example characteristics may include customers who have downloaded a particular mobile application. Example characteristics may include a particular demographic such as for example customs of a particular age category, gender, marital status, etc.

The recommendation may include a digital format recommendation. For example, the data mining module may identify a particular segment that is likely to accept a digital incentive sent as a notification within a mobile application. As another example, the data mining module may identify a particular segment that is likely to accept a digital incentive sent as an email. For example, a customer who is twenty (20) years old may be more likely to accept a digital incentive sent as a notification and a customer who is seventy (70) years old may be more likely to accept a digital incentive sent as an email.

The recommendation may include a recommendation for a digital incentive type. For example, the data mining module may identify a particular segment that is likely to accept a loyalty point modifier rather than a digital gift card. As another example, the data mining module may identify a particular segment that is likely to accept a digital gift card but only if it is $10 or more.

The recommendation may include a recommendation for where the digital incentive may be used. For example, the recommendation may include a recommendation to send a $5 digital gift card for a discount grocery store and that this digital gift card be sent to a first segment that has an annual salary below a threshold and may include a recommendation to send a $10 digital gift card for a premium grocery store and that this digital gift card be sent to a second segment that has an annual salary above the threshold.

The at least one recommendation may include a first recommendation that identifies a first segment that is likely to accept the one or more digital incentives and a second recommendation that identifies a second segment that is likely to accept the one or more digital incentives. For example, the first segment may include customers who are known to be college students and the second segment may include customers who are known to be retired.

The at least one recommendation may include a first digital incentive that is likely to be accepted by the first segment and a second digital incentive that is likely to be accepted by the second segment. For example, the recommendation may recommend a first digital incentive such as a digital gift card for the college students and the recommendation may recommend a second digital incentive such as a loyalty point multiplier for airline loyalty points for customers who are known to be retired.

The method 1000 includes sending, to the computing device associated with the requesting party, a signal that includes the at least one recommendation and at least one selectable interface element for accepting the at least one recommendation (step 1030).

The server computer system 120 sends a signal to the computing device 110 that includes the at least one recommendation and at least one selectable interface element for accepting the at least one recommendation. The recommendation may include information that identifies, for example, the one or more segments and may include a count of how many customers within the segment are going to receive the one or more digital incentives. It will be appreciated that multiple recommendations may be generated and as such the server computer system 120 may send a signal that includes the multiple recommendations and a selectable interface element for accepting each particular recommendation.

The requesting party may select one or more of the recommendations by, for example, selecting the selectable interface element associated with the recommendation. In response, the server computer system 120 may perform a method to obtain electronic addresses of computing devices associated with the accepted recommendation.

Figure 11:
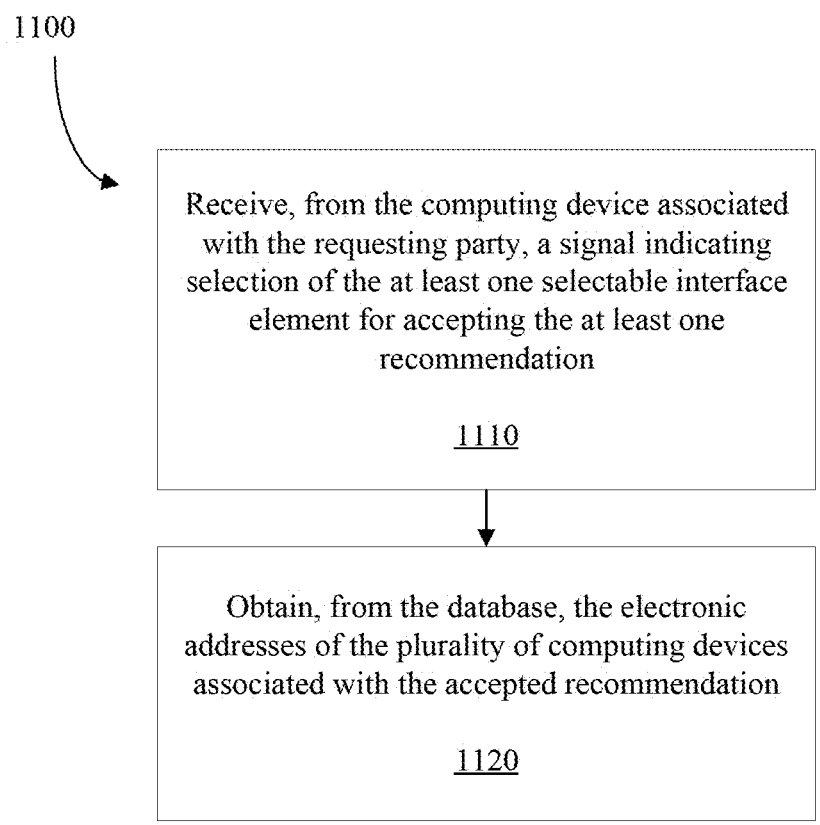
FIG. 11 is a flowchart showing operations performed by a server computer system for obtaining the electronic addresses of computing devices associated with the accepted recommendation according to an embodiment.

Reference is made to FIG. 11, which illustrates, in flowchart form, a method 1100 for obtaining the electronic addresses of computing devices associated with the accepted recommendation. The method 1100 may be implemented by a computing device having suitable processor-executable instructions for causing the computing device to carry out the described operations. The method 1100 may be implemented, in whole or in part, by the server computer system 120.

The method 1100 includes receiving, from the computing device associated with the requesting party, a signal indicating selection of the at least one selectable interface element for accepting the at least one recommendation (step 1110).

The server computer system 120 receives the signal from the computing device 110 that indicates selection of a particular selectable interface element for accepting a particular recommendation.

The method 1100 includes obtaining, from the database, the electronic addresses of the plurality of computing devices associated with the accepted recommendation (step 1120).

The particular recommendation may identify a segment of customers that are likely to accept the one or more digital incentives. The server computer system 120 obtains, from the database 140, electronic addresses of computing devices associated with the customers within the segment.

The server computer system 120 may then send the one or more digital incentives to the electronic addresses of the computing devices in accordance with step 540 of the method 500.

In one or more embodiments, the recommendation may identify a digital format that is likely to be accepted and as such the server computer system may generate the customized incentive interface in the digital format that is likely to be accepted.

Figure 12:
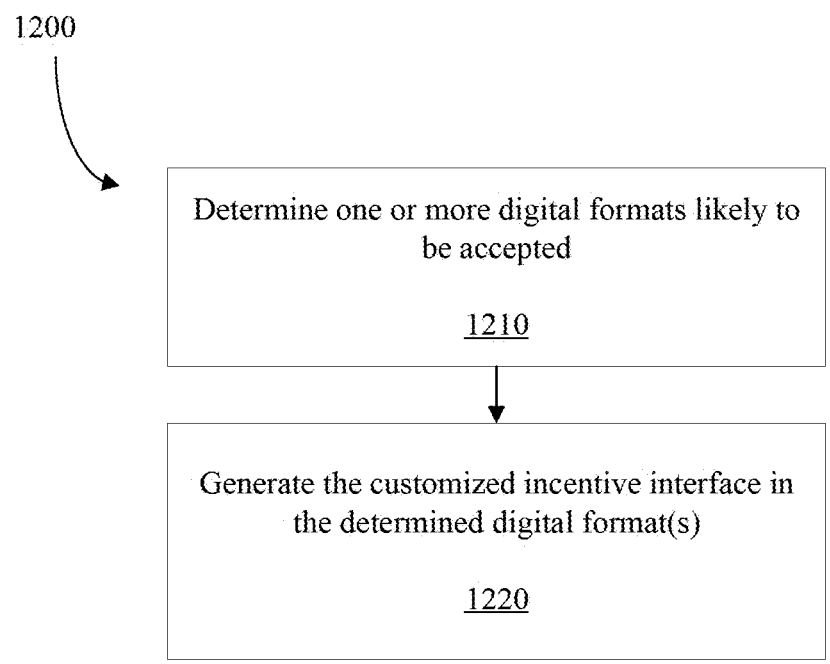
FIG. 12 is a flowchart showing operations performed by a server computer system for generating a customized incentive interface in a determined digital format according to an embodiment.

Reference is made to FIG. 12, which illustrates, in flowchart form, a method 1200 for generating a customized incentive interface in a determined digital format. The method 1200 may be implemented by a computing device having suitable processor-executable instructions for causing the computing device to carry out the described operations. The method 1200 may be implemented, in whole or in part, by the server computer system 120.

The method 1200 includes determining one or more digital formats likely to be accepted (step 1210).

In one or more embodiments, the server computer system 120 may engage the data mining module to determine a digital format that is likely to be accepted by a particular segment. For example, a particular segment may include customers that have a particular mobile application installed on their computing device and as such the data mining module may determine that the digital format that is likely to be accepted by the particular segment may be a notification that is to be displayed within the particular mobile application.

In one or more embodiments, the server computer system 120 may engage the data mining module to determine a digital format that is likely to be accepted by each customer within the segment. For example, the data mining module may analyze historical digital incentive data to determine a digital incentive that has been previously accepted by the customer and may identify that digital format of the previously accepted digital incentive as being the digital format likely to be accepted by the customer.

In one or more embodiments, the data mining module may determine that different customers within a particular segment may be more likely to accept a digital incentive if it is sent in a particular digital format. For example, a segment may include customers within a particular city. The data mining module may determine that customers under the age of forty (40) are more likely to accept a digital incentive sent via text message and customers over the age of forty (40) are more likely to accept a digital incentive sent via email.

The server computer system 120 generates the customized incentive interface in the determined digital format(s) (step 1220). The customized incentive interface may be automatically generated by the server computer system 120 in manners similar to that described herein. The server computer system 120 may generate the customized incentive interface in different digital formats and this may be done based on the digital formats identified during step 1210.

Once the customized incentive interface has been sent to the electronic addresses of the plurality computing devices, the server computer system 120 may receive, from a particular computing device, a signal indicating selection of a selectable interface element for accepting a particular digital incentive and in response the server computer system 120 may generate the digital incentive and send the digital incentive to the particular computing device.

Figure 13:
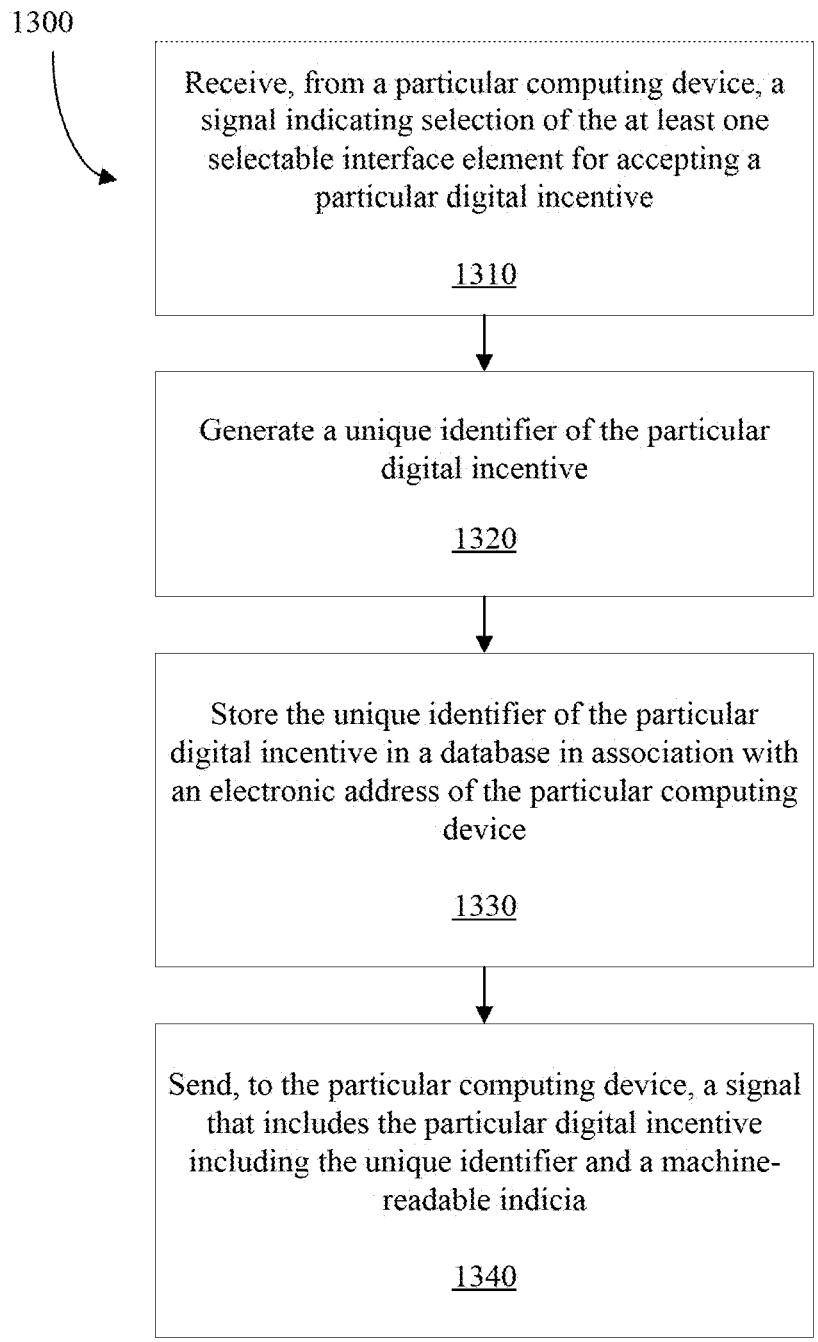
FIG. 13 is a flowchart showing operations performed by a server computer system for sending a particular digital incentive according to an embodiment.

Reference is made to FIG. 13, which illustrates, in flowchart form, a method 1300 for sending a particular digital incentive. The method 1300 may be implemented by a computing device having suitable processor-executable instructions for causing the computing device to carry out the described operations. The method 1300 may be implemented, in whole or in part, by the server computer system 120.

The method 1300 includes receiving, from a particular computing device, a signal indicating selection of the at least one selectable interface element for accepting a particular digital incentive (step 1310).

A recipient of the customized incentive interface may select a particular selectable interface element to accept a particular digital incentive and in response the computing device of the recipient may send the signal to the server computer system 120. The signal may identify the particular digital incentive that is being accepted.

The method 1300 includes generating a unique identifier of the particular digital incentive (step 1320).

In response to receiving the signal indicating selection of the at least one selectable interface element for accepting the particular digital incentive, the server computer system 120 generates a unique identifier of the particular digital incentive.

In one or more embodiments, the unique identifier may be generated using a random number generator. For example, the server computer system 120 may send a signal requesting that a random sixteen (16) digit number be generated. The server computer system 120 may receive the random sixteen (16) digit number.

In one or more embodiments, at least a portion of the unique identifier may be fixed. For example, the first four (4) digits of the sixteen (16) digit number may be fixed and this may be used, for example, to identify the requesting party, that is, the sender of the digital incentive. The remaining twelve (12) digits may be generated using a random number generator.

In one or more embodiments, the unique identifier may follow a sequence of identifiers assigned to digital incentives. For example, a unique identifier may end with one or more digits and the one or more digits may be incremented by a set amount, such as for example one (1) digit, each time a new unique number is to be generated. For example, a unique number may end with 0001 and the next unique number may end with 0002.

The method 1300 includes storing the unique identifier of the particular digital incentive in a database in association with an electronic address of the particular computing device (step 1330).

Once the unique identifier of the particular digital incentive has been generated, the server computer system 120 may send a signal to store the unique identifier in the database 140 in association with the electronic address of the particular computing device 110.

The method 1300 includes sending, to the particular computing device, a signal that includes the particular digital incentive including the unique identifier and a machine-readable indicia (step 1340).

The server computer system 120 may automatically generate the digital incentive to include the unique identifier. For example, a digital gift card skin may include an interface element that is to be populated using the unique identifier and the server computer system 120 may populate the interface element to include the unique identifier. The server computer system 120 may also generate a machine-readable indicia that may be used to redeem or otherwise use the digital incentive. The machine-readable indicia may include a barcode or a Quick Response (QR) code, for example.

The signal that includes the particular digital incentive is sent to the particular computing device. In one or more embodiments, the signal may cause the particular computing device to store the particular digital incentive in a digital wallet. The recipient may access the digital incentive within the digital wallet and this may cause, for example, the machine-readable indicia to be displayed on a display screen of the particular computing device. The machine-readable indicia may be scanned by a merchant and in this manner the digital incentive may be redeemed.

Figure 14:
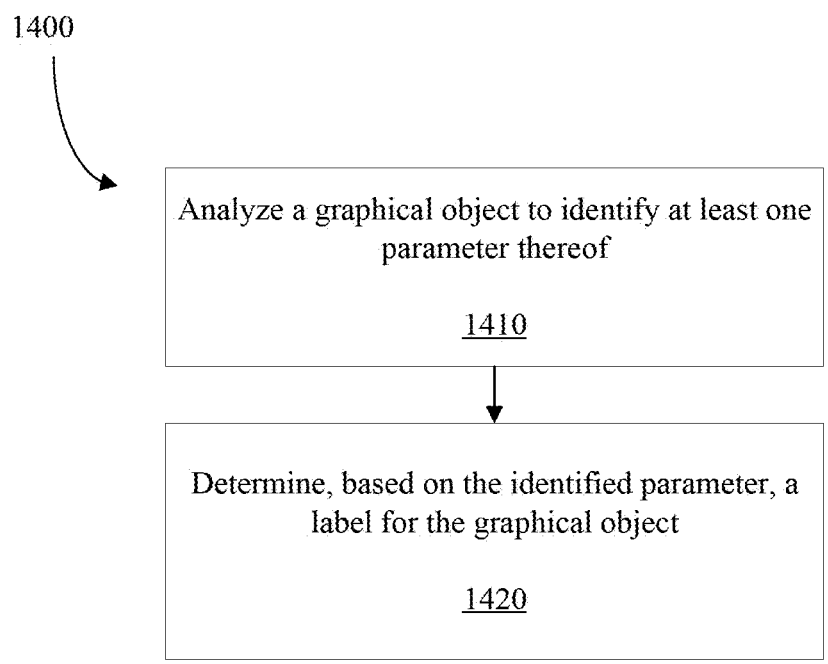
FIG. 14 is a flowchart showing operations performed by a server computer system for automatically determining a label for a graphical object according to an embodiment.

As mentioned previously, the server computer system 120 may analyze uploaded graphical objects to label or categorize each uploaded graphical object. Reference is made to FIG. 14, which illustrates, in flowchart form, a method 1400 for automatically determining a label for a graphical object. The method 1400 may be implemented by a computing device having suitable processor-executable instructions for causing the computing device to carry out the described operations. The method 1400 may be implemented, in whole or in part, by the server computer system 120.

The method 1400 includes analyzing a graphical object to identify at least one parameter thereof (step 1410).

In one or more embodiments, the server computer system 120 may analyze the graphical object to determine a size of the graphical object. The size may include the physical size of the image and/or the resolution of the image measured in pixels. For example, the server computer system 120 may determine, based on the size of a graphical object, that the graphical object is likely to be a digital gift card skin.

In one or more embodiments, the server computer system 120 may analyze the file type of the graphical object. For example, the file type of the graphical object may be an Encapsulated PostScript (EPS) file type and as such the server may determine that the graphical object is likely to be a company logo.

The method 1400 includes determining, based on the identified parameter, a label for the graphical object (step 1420).

Responsive to identifying the at least one parameter of the graphical object, the server computer system 120 may assign a label to the graphical object. For example, the server computer system 120 may determine, based on the size of the graphical object, that the graphical object is likely to be a digital gift card skin and as such the server computer system 120 may assign the label "digital gift card skin" to the graphical object.

It will be appreciated that although the server computer system 120 may label or categorize the graphical object, the requesting party may change or update the label of the graphical object and this may be done within the incentive management application.

The incentive management application may allow the requesting party to sell or otherwise offer incentives to one or more third parties and the server computer system 120 may manage and track purchases of the incentives on behalf of the requesting party. In this embodiment, the requesting party may be referred to as a provider of the incentives and the third party may be referred to as a purchaser of the incentives. The purchase of the incentives may be, for example, a bulk order of incentives.

In one or more embodiments, within the incentive management application, a purchaser may create an account and may select one or more incentives for purchase. As mentioned, the purchase may be a bulk order and thus may include a purchase of a large number of incentives. In the event that the purchaser completes a purchase of a bulk order of one or more incentives offered by the provider, the server computer system 120 may manage and track the bulk order on behalf of the provider.

Figure 15:
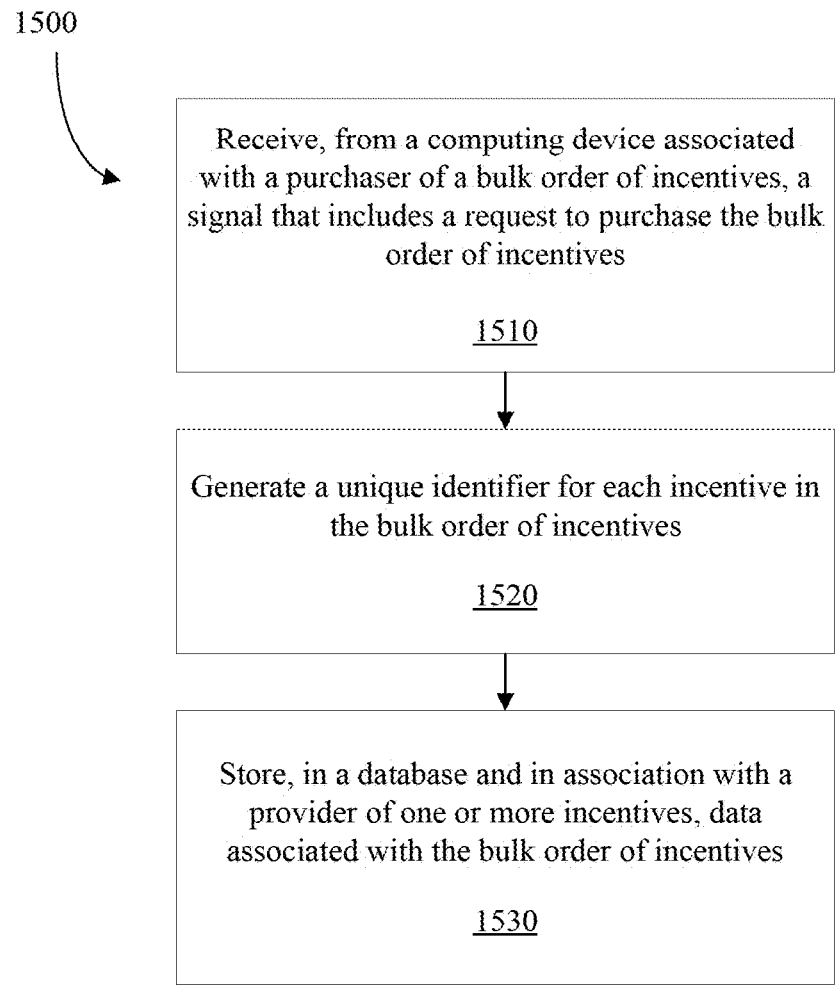
FIG. 15 is a flowchart showing operations performed by a server computer system for managing a bulk order of incentives according to an embodiment.

Reference is made to FIG. 15, which illustrates, in flowchart form, a method 1500 for managing a bulk order of incentives. The method 1500 may be implemented by a computing device having suitable processor-executable instructions for causing the computing device to carry out the described operations. The method 1500 may be implemented, in whole or in part, by the server computer system 120.

The method 1500 includes receiving, from a computing device associated with a purchaser of a bulk order of incentives, a signal that includes a request to purchase the bulk order of incentives (step 1510).

As mentioned, within the incentive management application, a purchaser may select one or more incentives for purchase. In this embodiment, the purchase is for a bulk order of incentives and as such the server computer system 120 receives a signal that includes the request to purchase the bulk order of incentives. The signal may include information identifying the provider of the incentives and one or more scopes relating to the incentives being purchased. For example, the one or more scopes may indicate the quantity of incentives being purchased and what incentives are being purchased. In one example, the bulk purchase may be for five hundred (500) digital gift cards that are valued at $5 each.

The method 1500 includes generating a unique identifier for each incentive in the bulk order of incentives (step 1520).

In this embodiment, after the request to purchase the bulk order of incentives is received, the server computer system 120 generates a unique identifier for each incentive.

In one or more embodiments, the unique identifier may be generated using a random number generator. For example, the server computer system 120 may send a signal requesting that a random sixteen (16) digit number be generated. The server computer system 120 may receive the random sixteen (16) digit number.

In one or more embodiments, at least a portion of the unique identifier may be fixed. For example, the first four (4) digits of the sixteen (16) digit number may be fixed and this may be used, for example, to identify the requesting party, that is, the sender of the digital incentive. The remaining twelve (12) digits may be generated using a random number generator.

In one or more embodiments, the unique identifier may follow a sequence of identifiers assigned to digital incentives. For example, a unique identifier may end with one or more digits and the one or more digits may be incremented by a set amount, such as for example one (1) digit, each time a new unique number is to be generated. For example, a unique number may end with 0001 and the next unique number may end with 0002.

The method 1500 includes storing, in a database and in association with a provider of the one or more incentives, data associated with the bulk order of incentives (step 1530).

Once the unique identifiers of the incentives being purchased in the bulk order have been generated, the server computer system 120 may send a signal to store data associated with the bulk order of incentives. In this embodiment, the data associated with the bulk order may include the unique numbers of the incentives and information identifying the purchaser of the incentives. The data is stored in the database in association with the provider. The data may also be stored in the database in association with the purchaser.

The server computer system 120 may provide a customized interface to a computing device associated with the provider that may allow the provider to manage and track bulk purchases of incentives provided thereby.

Figure 16:
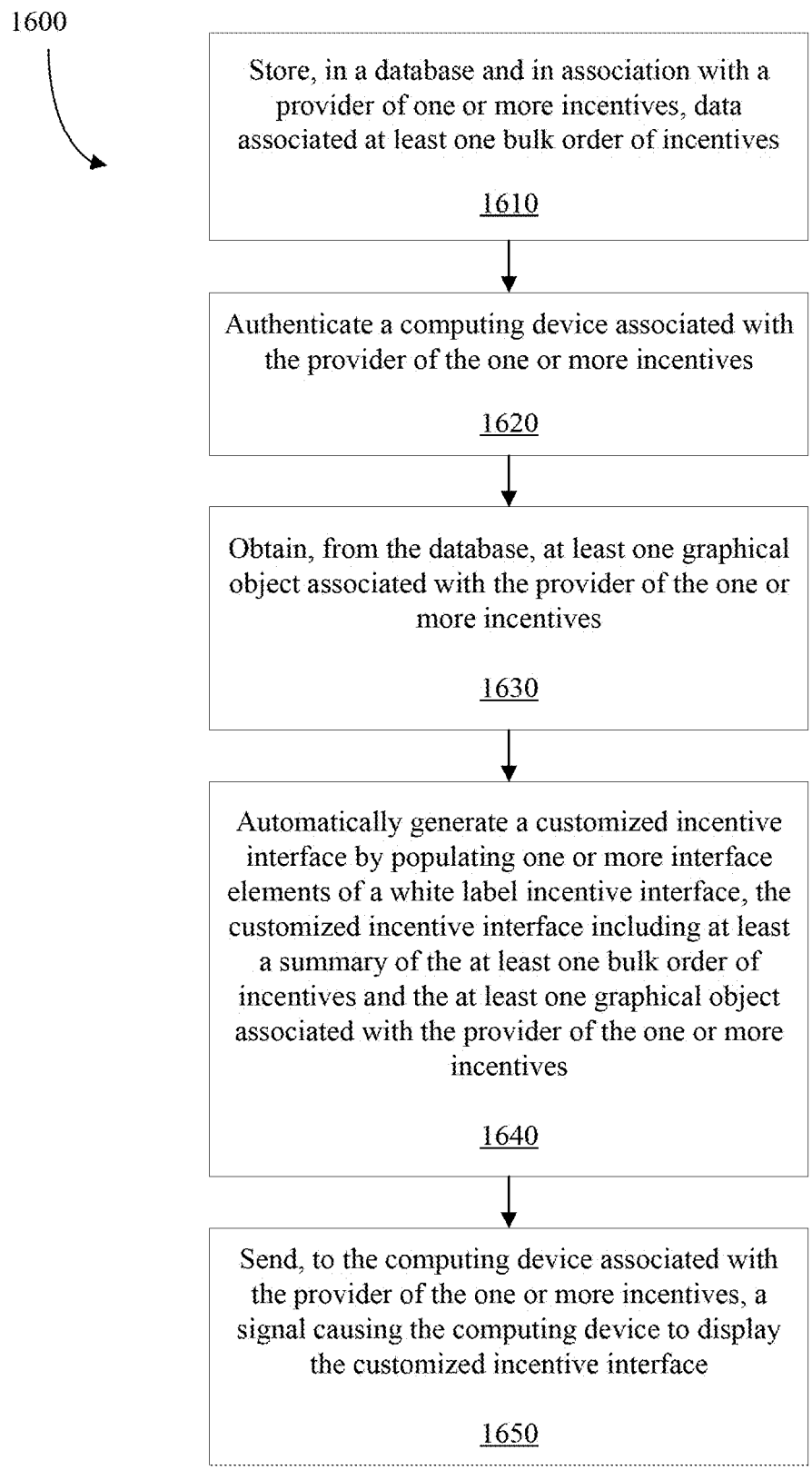
FIG. 16 is a flowchart showing operations performed by a server computer system for managing and tracking bulk orders of incentives according to an embodiment.

Reference is made to FIG. 16, which illustrates, in flowchart form, a method 1600 for managing and tracking bulk orders of incentives. The method 1600 may be implemented by a computing device having suitable processor-executable instructions for causing the computing device to carry out the described operations. The method 1600 may be implemented, in whole or in part, by the server computer system 120.

The method 1600 includes storing, in a database and in association with a provider of one or more incentives, data associated with at least one bulk order of incentives (step 1610).

The data associated with the at least one bulk order of incentives may be stored in the database in association with the provider of the one or more incentives in manners similar to that described herein, for example in manners described herein with reference to method 1500.

The method 1600 includes authenticating a computing device associated with the provider of the one or more incentives (step 1620).

In one or more embodiments, to access the incentive management application on the computing device 110 associated with the provider of the one or more incentives, the provider may be prompted to enter credentials submitted during the account creation. For example, the provider may be prompted to submit a username and a password associated with their account. In response to receiving the credentials, the server computer system 120 may authenticate the computing device 110 associated with the provider of the one or more incentives and may identify an account associated therewith.

The method 1600 includes obtaining, from the database, at least one graphical object associated with the provider of the one or more incentives (step 1630).

During account creation, the provider may have uploaded or submitted at least one graphical object associated therewith and the server computer system 120 may have stored the at least one graphical object in the database 140. In this embodiment, the server computer system 120 may obtain the at least one graphical object from the database 140.

As mentioned, one or more graphical objects uploaded may be labelled or tagged (either automatically or manually). As such, the server computer system 120 may obtain the at least one graphical object from the database 140 by selecting one or more graphical objects that were labelled or tagged with "logo".

The method 1600 includes sending, to the computing device associated with the provider of the one or more incentives, a signal causing the computing device to display an interface that includes the at least one graphical object and a summary of the at least one bulk order of incentives (step 1650).

In one or more embodiments, the interface may be a white label incentive interface that includes one or more interface elements and the server computer system 120 may populate the interface elements prior to sending the interface to the computing device 110 associated with the provider of the one or more incentives. For example, an interface element may be tagged as "logo" and as such the server computer system 120 may populate the interface element using the at least one graphical object obtained during step 1630. In this manner, the server computer system 120 may automatically generate a customized interface that includes the at least one graphical object (step 1640).

One or more interface elements may be populated using the data associated with the at least one bulk order of incentives. For example, the server computer system 120 may obtain identifying information of one or more purchasers and a count of incentives purchased by each purchaser and this may be used to populate an interface element to generate the summary of the at least one bulk order of incentives.

In this manner, the server computer system 120 may populate the interface such that the incentive management application is customized for the provider and this may be done responsive to successful authentication of the provider. It will be appreciated that different providers may also use the incentive management application and that the server computer system 120 may populate the interface for the different providers responsive to successful authentication thereof.

In one or more embodiments, the interface that includes the at least one graphical object and the summary of the at least one bulk order of incentives may include a selectable interface element for viewing additional information of a particular bulk order of incentives.

Figure 17:
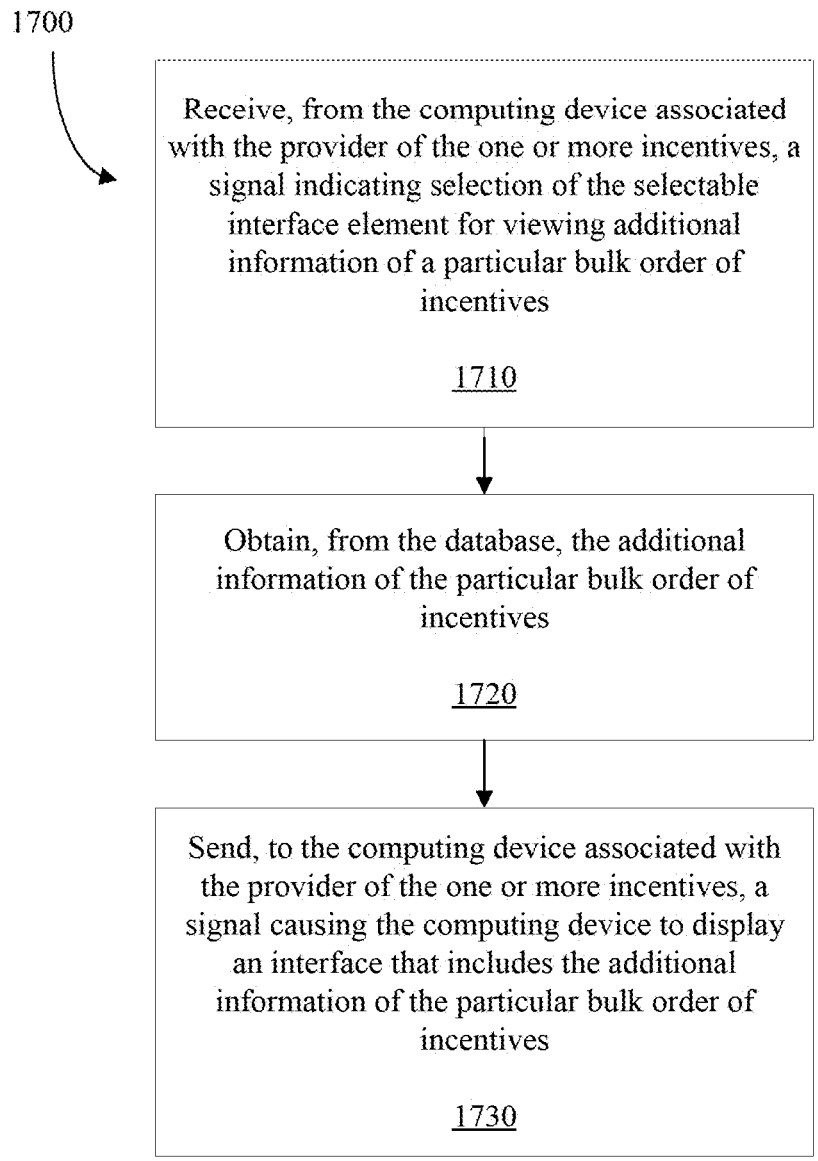
FIG. 17 is a flowchart showing operations performed by a server computer system for providing additional information of a particular bulk order of incentives according to an embodiment.

Reference is made to FIG. 17, which illustrates, in flowchart form, a method 1700 for providing additional information of a particular bulk order of incentives. The method 1700 may be implemented by a computing device having suitable processor-executable instructions for causing the computing device to carry out the described operations. The method 1700 may be implemented, in whole or in part, by the server computer system 120.

The method 1700 includes receiving, from the computing device associated with the provider of the one or more incentives, a signal indicating selection of the selectable interface element for viewing additional information of a particular bulk order of incentives (step 1710).

As mentioned, the interface may include a selectable interface element for viewing additional information of a particular bulk order of incentives. The selectable interface element may be positioned adjacent to the summary of the particular bulk order of incentives. The selectable interface element may be selected using, for example, an input device associated with the computing device 110. In response to selection of the selectable interface element, the computing device 110 may send a signal to the server computer system 120 indicating selection of the selectable interface element. The signal may identify the particular bulk order of incentives.

The method 1700 includes obtaining, from the database, the additional information of the particular bulk order of incentives (step 1720).

Responsive to receiving the signal indicating selection of the selectable interface element for viewing additional information of the particular bulk order of incentives, the server computer system 120 may obtain the additional information of the particular bulk order of incentives from the database 140. The additional information may include, for example, a list of each incentive purchased within the particular bulk order that includes the unique number of each incentive, an amount of each incentive, a type of each incentive, etc.

In one or more embodiments, the purchaser of the particular bulk order of incentives may provide information identifying the recipient of each incentive. For example, the incentive may include physical gift cards and as such the purchaser of the particular bulk order of incentives may provide a mailing address of the recipients of each incentive. As another example, the incentives may include digital incentives and as such the purchaser of the particular bulk order of incentives may provide electronic addresses of the recipients of each incentive. As such, the additional information may include the identifying information of the recipient of each incentive.

In one or more embodiments, the additional information may include a pickup location for the incentives. For example, the incentives may include physical gift cards and as such the purchaser may have indicated a particular location for picking up the physical gift cards. The physical location may include, for example, a particular retail location of the providers of the incentives.

The additional information may include a status of each incentive. For example, the incentives may include digital incentives and each digital incentive may be sent to an electronic address of a particular recipient. The status may indicate whether each recipient has accepted the incentive. For example, the particular recipient may accept the incentive and as such the status of the incentive may be set to "accepted". As another example, a particular incentive may have been sent to a recipient but may not have been accepted and as such the status of the incentive may be set to "sent".

The method 1700 includes sending, to the computing device associated with the provider of the one or more incentives, a signal causing the computing device to display an interface that includes the additional information of the particular bulk order of incentives (step 1730).

The server computer system 120 sends, to the computing device 110, a signal that causes the computing device 110 to display the interface that includes the additional information of the particular bulk order of incentives. The interface may be displayed as a new window within the incentive management application. The interface may include interface elements such as for example a scroll bar that may be used to scroll up or down to view the additional information of the particular bulk order of incentives. The interface may additionally include a graphical object associated with the providers of the incentives, similar to that described herein.

As mentioned, within the incentive management application, a purchaser may create an account and may select one or more incentives for purchase. It will be appreciated that in one or more embodiments, it may be required that the identity of the purchaser be verified and this may be done to fulfill, for example, know your customer (KYC) requirements. It will be appreciated that the identity of the purchaser may be verified by, for example, the financial institution associated with the server computer system 120 and may require the purchaser to provide or upload one or more government issued identity documents.

In one or more embodiments, responsive to the purchaser creating an account, the server computer system 120 may engage an application programming interface (API) associated with identity verification and may provide the purchaser the option to complete verification using the API.

In one or more embodiments, verification may include uploading one or more government issued identity documents and capturing a photo of a person registering as the purchaser. For example, once an image of a government issued identity document has been uploaded, the server computer system 120 may request that the computing device 110 open a camera or imaging device associated therewith and may prompt the user of the computing device 110 to capture a "selfie". The server computer system 120 may receive the image of the government issued identity document and the image of the user of the computing device 110 and may analyze the two images to verify the identity thereof.

The purchaser may create an account and complete purchases prior to being verified; however, the purchase may not be fulfilled until after the identity of the purchaser has been verified. In one or more embodiments, the provider of the incentives may have the option to allow a purchase prior to the identity of the purchaser being verified and may have the option to cancel or put on hold the purchase until the identity of the purchaser has been verified.

In one or more embodiments, the interface provided to the computing device associated with the provider of the one or more incentives, for example during step 1640 of the method 1600, may additionally include a verification status of the purchaser of the at least one bulk order of incentives. For example, the interface may include the graphical object, the summary of the at least one bulk order of incentives, and the verification status of the purchaser of the at least one bulk order of incentives. It will be appreciated that the verification status may be binary in that the verification status may be one of "verified" or "not verified".

The verification status of a purchaser may change. For example, the identity of a purchaser may be verified and in response the verification status of the purchaser may change from "not verified" to "verified". For example, a purchaser may complete a bulk order of incentives and after the purchase has been completed, may engage the API associated with verifying their identity. The purchaser may verify their identity using the API and as such the verification status of the purchaser may change from "not verified" to "verified". In response, the server computer system 120 may update, in real time, the verification status of the purchaser. In this manner, the provider of the incentives purchased by the purchaser may receive notice, in real-time, that the purchaser verification status has changed.

In one or more embodiments, the interface may additionally include a selectable interface element for flagging the purchaser of the at least one bulk order of incentives as suspicious. For example, a purchaser that is "not verified" may be deemed suspicious and the provider of the incentives may wish to flag the purchaser as suspicious and may want to cancel or put on hold the at least one bulk order of incentives.

Figure 18:
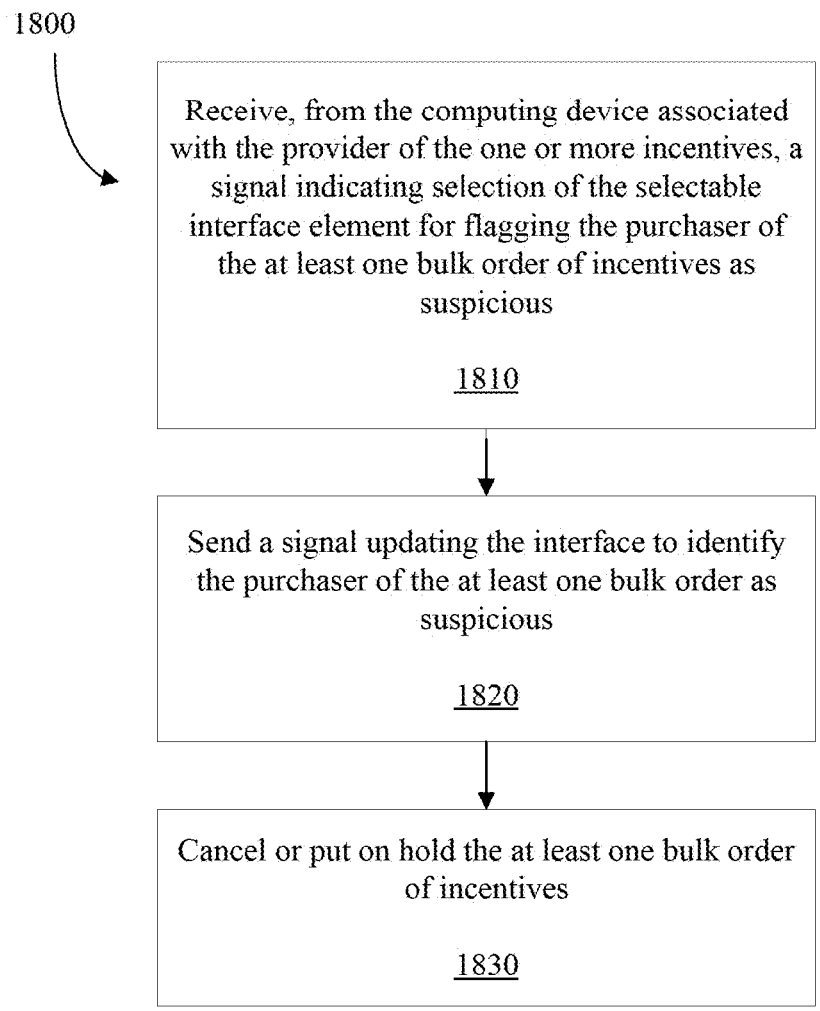
FIG. 18 is a flowchart showing operations performed by a server computer system for cancelling or putting on hold at least one bulk order of incentives according to an embodiment.

Reference is made to FIG. 18, which illustrates, in flowchart form, a method 1800 for cancelling or putting on hold at least one bulk order of incentives. The method 1800 may be implemented by a computing device having suitable processor-executable instructions for causing the computing device to carry out the described operations. The method 1800 may be implemented, in whole or in part, by the server computer system 120.

The method 1800 includes receiving, from the computing device associated with the provider of the one or more incentives, a signal indicating selection of the selectable interface element for flagging the purchaser of the at least one bulk order of incentives as suspicious (step 1810).

As mentioned, the interface may include a selectable interface element for flagging the purchaser of the at least one bulk order of incentives as suspicious. The selectable interface element may be selected using, for example, an input device associated with the computing device 110. In response to selection of the selectable interface element, the computing device 110 may send a signal to the server computer system 120 indicating selection of the selectable interface element. The signal may identify the purchaser being flagged.

The method 1800 includes sending a signal updating the interface to identify the purchaser of the at least one bulk order as suspicious (step 1820).

Responsive to receiving the signal indicating selection of the selectable interface element for flagging the purchaser of the at least one bulk order as suspicious, the server computer system 120 may send a signal updating the interface to identify the purchaser of the at least one bulk order as suspicious. For example, the interface may be updated to change the appearance of any orders completed by the purchaser such that they appear in a red font. As another example, the interface may be updated to include a graphical object positioned adjacent to each order completed by the purchaser that identifies the purchaser as being suspicious.

The method 1800 includes cancelling or putting on hold the at least one bulk order of incentives (step 1830).

Once the purchaser has been flagged as suspicious, the server computer system 120 may automatically cancel or put on hold the at least one bulk order of incentives completed by the purchaser.

In one or more embodiments, the server computer system 120 may prompt the provider of the incentives by sending a signal that causes the computing device 110 to display a selectable interface element for cancelling the bulk order and a selectable interface element for putting on hold the bulk order. In this manner, the provider may have the option to cancel or put on hold the bulk order until the identity of the purchaser is verified.

In one or more embodiments, responsive to the purchaser being flagged as being suspicious, the server computer system 120 may identify one or more additional orders completed by the purchaser. The one or more additional orders may be for incentives provided by the provider or may be one or more additional orders for incentives provided by one or more other providers. The server computer system 120 may cancel or put on hold the one or more additional orders completed by the purchaser and may update interfaces provided to the one or more other providers to identify the purchaser as suspicious. In this manner, the server computer system 120 may cancel or put on hold all orders made by the purchaser and this may reduce or eliminate fraud issues for one or more other providers of incentives that have accounts with the incentive management application.

As mentioned, the purchaser of a bulk order of incentives may provide electronic addresses of a plurality of computing devices associated with recipients of the incentives. The server computer system 120 may send the incentives to the recipients using the electronic addresses. The incentives may include, for example, the unique number of the incentive. The incentive may be sent using a customized incentive interface and/or a customized digital gift card skin and this may be done in manners described herein, for example with reference to FIGS. 5 to 9.

In one or more embodiments, a unique code may be required to redeem a particular incentive. For example, a digital incentive such as a digital gift card may be assigned a unique number and a unique code. The unique code may be required to redeem the digital gift card. In one or more embodiments, the unique code may be generated by the server computer system 120 and provided to the recipient of the incentive. For example, a purchaser may complete a bulk order of digital gift cards and may provide electronic addresses of recipients of the digital gift cards. The purchaser may receive the unique number of each digital gift card but may not be provided the unique code of each digital gift card. The server computer system 120 may generate a unique code for each digital gift card and may send the unique code to the electronic address of the recipient of the digital gift card. The unique code may be sent as a separate communication than the incentive. For example, the recipient may receive a first email that includes the incentive and may receive a second email, different than the first email, that includes the unique code. In this manner, the unique number and the unique code are sent separately and the unique code is only sent to the recipient of the incentive. This may reduce the risk of fraud and may reduce the risk of the incentive being used by someone other than the recipient.

The incentive management application described herein may allow the provider and/or the requester to update and maintain information associated therewith. For example, the incentive management application may allow the provider to update one or more physical retail locations associated therewith.

The methods described herein may be modified and/or operations of such methods combined to provide other methods.

Example embodiments of the present application are not limited to any particular operating system, system architecture, mobile device architecture, server architecture, or computer programming language.

It will be understood that the applications, modules, routines, processes, threads, or other software components implementing the described method/process may be realized using standard computer programming techniques and languages. The present application is not limited to particular processors, computer languages, computer programming conventions, data structures, or other such implementation details. Those skilled in the art will recognize that the described processes may be implemented as a part of computer-executable code stored in volatile or non-volatile memory, as part of an application-specific integrated chip (ASIC), etc.

As noted, certain adaptations and modifications of the described embodiments can be made. Therefore, the herein discussed embodiments are considered to be illustrative and not restrictive.

What is claimed is:

1. A server computer system comprising:
   a communications module;
   a processor coupled with the communications module; and
   a memory coupled to the processor and storing processor-executable instructions which, when executed by the processor, configure the processor to:
   receive, via the communications module and from a computing device associated with a purchaser of at least one bulk order of incentives, a signal that includes a request to purchase the bulk order of incentives;
   generate a unique identifier and a unique code for each incentive in the bulk order, the unique code being required to redeem the incentive;
   send, via the communications module and to the computing device associated with the purchaser, the unique identifier for each incentive in the bulk order but not the unique code for each incentive in the bulk order;
   obtain electronic addresses of a plurality of computing devices associated with recipients of at least one incentive in the bulk order;
   send, via the communications module and to the electronic addresses of the plurality of computing devices associated with the recipients, a first electronic communication that includes the unique identifier of the at least one incentive and a second electronic communication separate from the first electronic communication and including the unique code of the at least one incentive, the unique code being sent to only the recipients of the at least one incentive and never to the purchaser;
   store, in a database maintained by the server computer system and associated with a provider of one or more incentives in the bulk order, data associated with the bulk order, the data including (1) identifying information of the purchaser, (2) the unique identifier for each incentive in the bulk order, and (3) the unique code for each incentive in the bulk order;
   authenticate a computing device associated with the provider, the computing device associated with the provider being different from both the computing device associated with the purchaser and the plurality of computing devices associated with the recipients;
   obtain, from the database, at least one graphical object associated with the provider;
   automatically generate a customized incentive interface by populating one or more interface elements of a white label incentive interface, the customized incentive interface including (1) a selectable interface element for flagging the purchaser as suspicious, (2) a summary of the bulk order, and (3) the at least one graphical object associated with the provider of the one or more incentives;
   determine a verification status of the purchaser;
   send, via the communications module and to the computing device associated with the provider, a signal causing the computing device associated with the provider to display the customized incentive interface that includes an indication of the verification status of the purchaser, the summary of the bulk order, and the at least one graphical object associated with the provider;
   receive, via the communications module and from the computing device associated with the provider, a signal indicating selection of the selectable interface element for flagging the purchaser as suspicious;

responsive to receiving the signal indicating the selection of the selectable interface element for flagging the purchaser as suspicious, send, via the communications module and to the computing device associated with the provider, a signal updating the customized incentive interface to identify the purchaser as suspicious; and cancel or put on hold the bulk order of incentives based on the purchaser being identified as suspicious.

2. The server computer system of claim 1, wherein the processor-executable instructions, when executed by the processor, further configure the processor to:

determine a change in the verification status of the purchaser; and send, via the communications module and to the computing device associated with the provider, a signal updating the indication of the verification status of the purchaser based on the determined change in the verification status.

3. The server computer system of claim 1, wherein the customized incentive interface includes a selectable interface element for viewing additional information of the bulk order and the processor-executable instructions, when executed by the processor, further configure the processor to:

receive, via the communications module and from the computing device associated with the provider, a signal indicating selection of the selectable interface element for viewing additional information of the bulk order;

responsive to receiving the signal indicating selection of the selectable interface element for viewing additional information of the bulk order, obtain, from the database, the additional information of the bulk order; and send, via the communications module and to the computing device associated with the provider, a signal causing the device to display an interface that includes the additional information of the bulk order.

4. The server computer system of claim 1, wherein at least a portion of the unique identifier for each incentive is generated using a random number generator.

5. The server computer system of claim 1, wherein the processor-executable instructions, when executed by the processor, further configure the processor to:

identify one or more additional bulk orders completed by the purchaser; and cancel or put on hold the identified one or more additional bulk orders completed by the purchaser.

6. The server computer system of claim 1, wherein when determining the verification status of the purchaser, the processor-executable instructions, when executed by the processor, further configure the processor to:

engage an application programming interface to verify an identity of the purchaser.

7. The server computer system of claim 1, wherein the determining the verification status of the purchaser is completed prior to completing the purchase of the bulk order.

8. A computer-implemented method executed by a processor of a server computer system, the method comprising:

receiving, via a communications module and from a computing device associated with a purchaser of at least one bulk order of incentives, a signal that includes a request to purchase the bulk order;

generating a unique identifier and a unique code for each incentive in the bulk order, the unique code being required to redeem the incentive;

sending, via the communications module and to the computing device associated with the purchaser, the unique identifier for each incentive in the bulk order but not the unique code for each incentive in the bulk order;

obtaining electronic addresses of a plurality of computing devices associated with recipients of at least one incentive in the bulk order;

sending, via the communications module and to the electronic addresses of the plurality of computing devices associated with the recipients, a first electronic communication that includes the unique identifier of the at least one incentive and a second electronic communication separate from the first electronic communication and including the unique code of the at least one incentive, the unique code being sent to only the recipients of the at least one incentive and never to the purchaser;

storing, in a database maintained by the server computer system and associated with a provider of one or more incentives in the bulk order, data associated with the bulk order, the data including (1) identifying information of the purchaser, (2) the unique identifier for each incentive in the bulk order, and (3) the unique code for each incentive in the bulk order;

authenticating a computing device associated with the provider, the computing device associated with the provider being different from both the computing device associated with the purchaser and the plurality of computing devices associated with the recipients;

obtaining, from the database, at least one graphical object associated with the provider;

automatically generating a customized incentive interface by populating one or more interface elements of a white label incentive interface, the customized incentive interface including (1) a selectable interface element for flagging the purchaser as suspicious, (2) a summary of the bulk order, and (3) the at least one graphical object associated with the provider;

determining a verification status of the purchaser;

sending, via the communications module and to the computing device associated with the provider, a signal causing the computing device associated with the provider to display the customized incentive interface that includes an indication of the verification status of the purchaser, the summary of the bulk order, and the at least one graphical object associated with the provider;

receiving, via the communications module and from the computing device associated with the provider, a signal indicating selection of the selectable interface element for flagging the purchaser as suspicious;

responsive to receiving the signal indicating the selection of the selectable interface element for flagging the purchaser as suspicious, sending, via the communications module and to the computing device associated with the provider, a signal updating the customized incentive interface to identify the purchaser as suspicious; and cancelling or putting on hold the bulk order of incentives based on the purchaser being identified as suspicious.

9. The computer-implemented method of claim 8, further comprising:

determining a change in the verification status of the purchaser of the at least one bulk order of incentives; and sending, via the communications module and to the computing device associated with the provider of the one or more incentives, a signal updating the indication of the verification status of the purchaser of the at least one bulk order of incentives based on the determined change in the verification status.

10. The computer-implemented method of claim 8, wherein the customized incentive interface includes a selectable interface element for viewing additional information of the bulk order, the method further comprising:
   receiving, via the communications module and from the computing device associated with the provider, a signal indicating selection of the selectable interface element for viewing additional information of the bulk order;
   responsive to receiving the signal indicating selection of the selectable interface element for viewing additional information of the bulk order, obtaining, from the database, the additional information of the bulk order; and
   sending, via the communications module and to the computing device associated with the provider, a signal causing the device to display an interface that includes the additional information of the bulk order.

11. The computer-implemented method of claim 8, wherein at least a portion of the unique identifier for each incentive is generated using a random number generator.

12. The computer-implemented method of claim 8, further comprising:
   identifying one or more additional bulk orders completed by the purchaser; and
   cancelling or put on holding the identified one or more additional bulk orders completed by the purchaser.

13. The computer-implemented method of claim 8, wherein when determining the verification status of the purchaser, the method further comprises:
   engaging an application programming interface to verify an identity of the purchaser.

14. The computer-implemented method of claim 8, wherein the determining the verification status of the purchaser is completed prior to completing the purchase of the bulk order.

15. A non-transitory computer readable storage medium comprising processor-executable instructions which, when executed, configure a processor to:
   receive, via a communications module and from a computing device associated with a purchaser of at least one bulk order of incentives, a signal that includes a request to purchase the bulk order of incentives;
   generate a unique identifier and a unique code for each incentive in the bulk order, the unique code being required to redeem the incentive;
   send, via the communications module and to the computing device associated with the purchaser, the unique identifier for each incentive in the bulk order but not the unique code for each incentive in the bulk order;
   obtain electronic addresses of a plurality of computing devices associated with recipients of at least one incentive in the bulk order;
   send, via the communications module and to the electronic addresses of the plurality of computing devices associated with the recipients, a first electronic communication that includes the unique identifier of the at least one incentive and a second electronic communication separate from the first electronic communication and including the unique code of the at least one incentive, the unique code being sent to only the recipients of the at least one incentive and never to the purchaser;
   store, in a database maintained by a server computer system and associated with a provider of one or more incentives in the bulk order, data associated with the bulk order, the data including (1) identifying information of the purchaser, (2) the unique identifier for each incentive in the bulk order, and (3) the unique code for each incentive in the bulk order;
   authenticate a computing device associated with the provider, the computing device associated with the provider being different from both the computing device associated with the purchaser and the plurality of computing devices associated with the recipients;
   obtain, from the database, at least one graphical object associated with the provider;
   automatically generate a customized incentive interface by populating one or more interface elements of a white label incentive interface, the customized incentive interface including (1) a selectable interface element for flagging the purchaser as suspicious, (2) a summary of the bulk order, and (3) the at least one graphical object associated with the provider of the one or more incentives;
   determine a verification status of the purchaser;
   send, via the communications module and to the computing device associated with the provider, a signal causing the computing device associated with the provider to display the customized incentive interface that includes an indication of the verification status of the purchaser, the summary of the bulk order, and the at least one graphical object associated with the provider;
   receive, via the communications module and from the computing device associated with the provider, a signal indicating selection of the selectable interface element for flagging the purchaser as suspicious;
   responsive to receiving the signal indicating the selection of the selectable interface element for flagging the purchaser as suspicious, send, via the communications module and to the computing device associated with the provider, a signal updating the customized incentive interface to identify the purchaser as suspicious; and
   cancel or put on hold the bulk order of incentives based on the purchaser being identified as suspicious.

16. The non-transitory computer readable storage medium of claim 15, wherein the processor-executable instructions, when executed by the processor, further configure the processor to:
   determine a change in the verification status of the purchaser; and
   send, via the communications module and to the computing device associated with the provider, a signal updating the indication of the verification status of the purchaser based on the determined change in the verification status.

17. The non-transitory computer readable storage medium of claim 15, wherein the customized incentive interface includes a selectable interface element for viewing additional information of the bulk order and the processor-executable instructions, when executed by the processor, further configure the processor to:
   receive, via the communications module and from the computing device associated with the provider, a signal indicating selection of the selectable interface element for viewing additional information of the bulk order;
   responsive to receiving the signal indicating selection of the selectable interface element for viewing additional information of the bulk order, obtain, from the database, the additional information of the bulk order; and
   send, via the communications module and to the computing device associated with the provider, a signal causing the device to display an interface that includes the additional information of the bulk order.

18. The non-transitory computer readable storage medium of claim 15, wherein the processor-executable instructions, when executed by the processor, further configure the processor to:
   identify one or more additional bulk orders completed by the purchaser; and
   cancel or put on hold the identified one or more additional bulk orders completed by the purchaser.

19. The non-transitory computer readable storage medium of claim 15, wherein when determining the verification status of the purchaser, the processor-executable instructions, when executed by the processor, further configure the processor to:
   engage an application programming interface to verify an identity of the purchaser.

20. The non-transitory computer readable storage medium of claim 15, wherein the determining the verification status of the purchaser is completed prior to completing the purchase of the bulk order.

* * * * *